US012786306B2

(12) United States Patent
Chaudhri et al.

(10) Patent No.: US 12,786,306 B2
(45) Date of Patent: *Nov. 3, 2026

(54) LASER PROJECTED WAYFINDING INTERFACE

(71) Applicant: Hewlett-Packard Development Company, L.P., Spring, TX (US)

(72) Inventors: Imran A. Chaudhri, San Francisco, CA (US); Kenneth Luke Kocienda, Mill Valley, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/365,167

(22) Filed: Oct. 21, 2025

(65) Prior Publication Data

US 2026/0046353 A1 Feb. 12, 2026

Related U.S. Application Data

(63) Continuation of application No. 18/607,391, filed on Mar. 15, 2024, now Pat. No. 12,477,057, which is a (Continued)

(51) Int. Cl.
*G06F 3/042* (2006.01)
*G06F 1/16* (2006.01)
(Continued)

(52) U.S. Cl.
CPC ...... *H04M 1/724094* (2022.02); *G06F 1/163* (2013.01); *G06F 1/1639* (2013.01);
(Continued)

(58) Field of Classification Search
CPC ........ G06F 3/0425; G06F 1/163; G06F 1/164; G06F 3/0482
See application file for complete search history.

(56) References Cited

U.S. PATENT DOCUMENTS 10,284,753 B1 * 5/2019 Naik .................... H04N 13/279
11,936,802 B2 3/2024 Chaudhri et al.
(Continued)

FOREIGN PATENT DOCUMENTS

KR 10-2016-0037526 A 4/2016
WO WO-2017062621 A1 * 4/2017 ........... A61B 5/0022

OTHER PUBLICATIONS

Kanel, "Sixth Sense Technology," Thesis for the Bachelor Degree of Engineering in Information and Technology, Centria University of Applied Sciences, May 2014, 46 pages.
(Continued)

*Primary Examiner* — Cory A Almeida
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a wearable multimedia device determines a plurality of points of interest and, for each of the points of interest, a heading of that point of interest relative to the device, and a distance between that point of interest and the device. The device presents a user interface including a plurality of user interface elements arranged according to one or more curved layers. Each of the user interface elements corresponds to a different one of the points of interest. A position of each of
(Continued)

the user interface elements relative to each of the other user interface elements in the user interface is determined based on the first data and the second data.

20 Claims, 17 Drawing Sheets

Related U.S. Application Data continuation of application No. 17/687,524, filed on Mar. 4, 2022, now Pat. No. 11,936,802.

(51) Int. Cl.
*G06F 3/0482* (2013.01)
*H04M 1/72409* (2021.01)
*H04M 1/72457* (2021.01)

(52) U.S. Cl.
CPC .......... *G06F 1/1694* (2013.01); *G06F 3/0425* (2013.01); *G06F 3/0482* (2013.01); *H04M 1/72457* (2021.01)

(56) References Cited

U.S. PATENT DOCUMENTS

| | | | | |
|---|---|---|---|---|
| 2009/0319181 | A1 | 12/2009 | Khosravy et al. | |
| 2012/0176410 | A1 | 7/2012 | Meier et al. | |
| 2017/0123487 | A1 | 5/2017 | Hazra et al. | |
| 2017/0227655 | A1 | 8/2017 | Kim et al. | |
| 2019/0121522 | A1* | 4/2019 | Davis | G06V 40/28 |
| 2023/0283705 | A1 | 9/2023 | Chaudhri et al. | |

OTHER PUBLICATIONS

Mann et al., "Telepointer: Hands-free completely self-contained wearable visual augmented reality without headwear and without any infrastructural reliance", IEEE Fourth International Symposium on Wearable Computers, Atlanta, GA, USA, Oct. 16-17, 2000, 4 pages.
Mann, Steve "Wearable Computing: A First Step Toward Personal Imaging," IEEE Computer, Feb. 1997, vol. 30, No. 2, pp. 25-32.
Mann, Steve, "Wearable, tetherless computer-mediated reality," American Association of Artificial Intelligence Technical Report, Feb. 1996, pp. 62-69.
Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.
Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.
Shetty et al., "Sixth Sense Technology," International Journal of Science and Research, Dec. 2014, vol. 3, No. 12, pp. 1068-1073.

* cited by examiner

LASER PROJECTED WAYFINDING INTERFACE

CROSS-REFERENCE TO RELATED APPLICATION

This application is a continuation of, and claims priority to, U.S. patent application Ser. No. 18/607,391, filed Mar. 15, 2024, which is a continuation of U.S. patent application Ser. No. 17/687,524, filed Mar. 4, 2022, the entire contents of which are incorporated herein by reference.

TECHNICAL FIELD

This disclosure relates generally to laser projected virtual interfaces.

BACKGROUND

High-precision laser scanners (e.g., MEMS scanners) have been developed that can turn any surface into a virtual interface (VI). For example, a laser projected VI can be projected onto the palm of a user's hand or other surface. Three-dimensional (3D) depth sensors (e.g., a time of flight (TOF) camera) can be used to detect user gestures that are interacting with one or more VI elements projected on the surface. In the case of the user's palm, there is very little surface area in which to project a detailed VI. This limited space can limit the number and types of user interactions with the VI, and thus potentially limit the number and types of applications that rely on the VI for input and output.

SUMMARY

Systems, methods, devices and non-transitory, computer-readable storage mediums are disclosed for a laser projected VI.

In general, a wearable multimedia device can include a projector subsystem configured to present information visually to a user in the form of projected light. For example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with VI.

In some implementations, a wearable multimedia device can present a VI that allows a user to ascertain her current location relative to one or more points of interest. This VI may also be referred to as a wayfinding interface.

In some implementations, the wayfinding interface can present information to the user using several user interface elements arranged according to one or more curved layers. For example, the wayfinding interface can represent each of several points of interest using a corresponding user interface element, such as a curved segment or other shape. Further, the curved layers can be stacked or concentrically arranged, such that the curved layers are arranged about an origin point. The angular position of each user interface element (e.g., relative to the origin point) can represent the heading of the corresponding point of interest from the user (or an approximation thereof). Further, the distance of each user interface element from the origin point can represent the distance of the corresponding point of interest from the user (or an approximation thereof). Further, the wearable multimedia device can continuously update the wayfinding interface based on the movements of the user, such that the user can continuously ascertain the locations of each of the points of interest relative to her current location.

The implementations described herein can provide various technical benefits. For instance, the wayfinding interfaces described herein can provide an improved user interface that allows a user to identify points of interests in her vicinity, and navigate to those points of interest in a more intuitive manner. As an example, a user can view a wayfinding interface to visually determine specific points of interest in her vicinity, and to visually determine the heading and distance of each point of interest relative to her current location concurrently. Further, the user can navigate to a particular point of interest by turning her body until the corresponding user interface element is in a particular angular position from the origin point (e.g., indicating that the point of interest in directly in front of her), and walking in that direction until she arrives at the point of interest. Further, while the user is walking, she can periodically or continuously refer to the wayfinding interface to ensure that she is walking in the correct direction. Thus, the user is less likely to navigate in an unintended or erroneous direction.

Further, by reducing the occurrence of erroneous and/or unintended travel by the user, the wayfinding interfaces can reduce the resources expended by the wearable multimedia device during operation. For instance, if a user becomes lost, she may spend more time interacting with the wearable multimedia device to correct or reverse her travel. Accordingly, the wearable multimedia device may expend resources—such as computational resources (e.g., CPU cycles), memory resources, storage resources, network resources, and/or battery resources—that might otherwise not need to be expended. By reducing the likelihood of user error, the wearable multimedia device can reduce the expenditure of resources in correcting or reversing those errors. Thus, the wearable multimedia device can operate in a more efficient manner.

In at least some embodiments, a method includes: determining, by a wearable multimedia device, first data regarding a location of the wearable multimedia device and an orientation of the wearable multimedia device; determining, by the wearable multimedia device, a plurality of points of interest; determining, by the wearable multimedia device, second data regarding the points of interest, where the second data includes, for each of the points of interest: a heading of that point of interest relative to the wearable multimedia device, and a distance between that point of interest and the wearable multimedia device; and presenting, by the wearable multimedia device, a user interface representing the points of interest, where the user interface includes a plurality of user interface elements arranged according to one or more curved layers, where each of the user interface elements correspond to a different one of the points of interest, and where a position of each of the user interface elements relative to each of the other user interface elements in the user interface is determined based on the first data and the second data.

Embodiments can include one or more of the following features.

In some embodiments, the user interface elements can be arranged according to a plurality of curved layers, where the curved layers are concentrically arranged in the user interface.

In some embodiments, a first subset of the user interface elements can be arranged on a first curved layer having a first radius, and a second subset of the user interface elements can be arranged on a second curved layer having a second radius. The first curved layer and the second curved layer can be concentric. The second radius can be greater than the first radius.

In some embodiments, the first subset of the user interface elements can represent a first subset of the points of interest that are within a first distance range from the wearable multimedia device, and the second subset of the user interface elements can represent a second subset of the points of interest that are within a second distance range from the wearable multimedia device. The second distance range can be greater than the first distance range.

In some embodiments, user interface can include an origin point. Further, a distance from each of the user interface elements to the origin point can represent the distance from a corresponding one of the points of interest to the wearable multimedia device.

In some embodiments, the user interface can include an origin point. Further, an angular position of each of the user interface elements relative to a vector extending from the origin point can represent the heading of a corresponding one of the points of interest relative to the wearable multimedia device.

In some embodiments, the vector can represent the orientation of the wearable multimedia device.

In some embodiments, the angular positions of the user interface elements can be within a 360° angular range about the origin point.

In some embodiments, the angular positions of the user interface elements can be within a pre-determined angular range about the origin point, wherein the angular range is less than 360°.

In some embodiments, the first data can be determined based on sensor data obtained by at least one of a compass or a gyroscope of the wearable multimedia device.

In some embodiments, the first data can be determined based on output of a location processor of the wearable multimedia device.

In some embodiments, at least a portion of the second data can be retrieved from one or more computer system remote from the wearable multimedia device.

In some embodiments, the method can further include: determining, based on the first data, that at least one of the location of the wearable multimedia device or the orientation of the wearable multimedia device has changed; and responsive to determining that at least one of the location of the wearable multimedia device or the orientation of the wearable multimedia device has changed, modifying a position of at least one of the user interface elements in the user interface.

In some embodiments, the method can further include: receiving user input indicating a selection of a first user interface element from among the plurality of user interface elements, the first user interface element representing a first point of interest from among the plurality of points of interest; and responsive to receiving the user input, presenting third data regarding the first point of interest using the user interface.

In some embodiments, the third data can include at least one of: a telephone number associated with the first point of interest, a physical address of the first point of interest, instructions for navigating to the first point of interest, a web address associated with the first point of interest, operating hours of the first point of interest, or media content representing the first point of interest.

In some embodiments, the method can further include: receiving user input indicating a selection of a first user interface element from among the plurality of user interface elements, the first user interface element representing a first point of interest from among the plurality of points of interest; and responsive to receiving the user input, causing the first point of interest to perform one or more operations.

In some embodiments, at least one of the points of interests can represent a venue.

In some embodiments, at least one of the points of interests can represent one or more people.

In some embodiments, at least one of the points of interests can represent one or more items.

In some embodiments, the one or more items can include a vehicle.

In some embodiments, the one or more items can include a lighting device.

In some embodiments, the one or more items can include networking equipment.

In some embodiments, the one or more items can include audio visual equipment.

In some embodiments, the one or more items can include an appliance.

In some embodiments, the one or more items can comprise a smart phone.

In some embodiments, the one or more items can include a tracking device configured to be attached to an object.

In some embodiments, presenting the user interface can include projecting, using a laser projector of the wearable multimedia device, the user interface on a surface.

In some embodiments, the surface can be a surface of a hand of a user.

In some embodiments, the surface can be a surface of a palm of a user.

In at least some embodiments, a wearable multimedia device includes: at least one processor; and memory storing instructions that, when executed by the at least one processor, cause the at least one processor to perform various operations, including one or more of the methods described herein.

In at least some embodiments, one or more non-transitory computer-readable media store instructions that, when executed by at least one processor, cause the at least one processor to perform operations, including one or more of the methods described herein.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Wearable Multimedia Device

Figure 1:
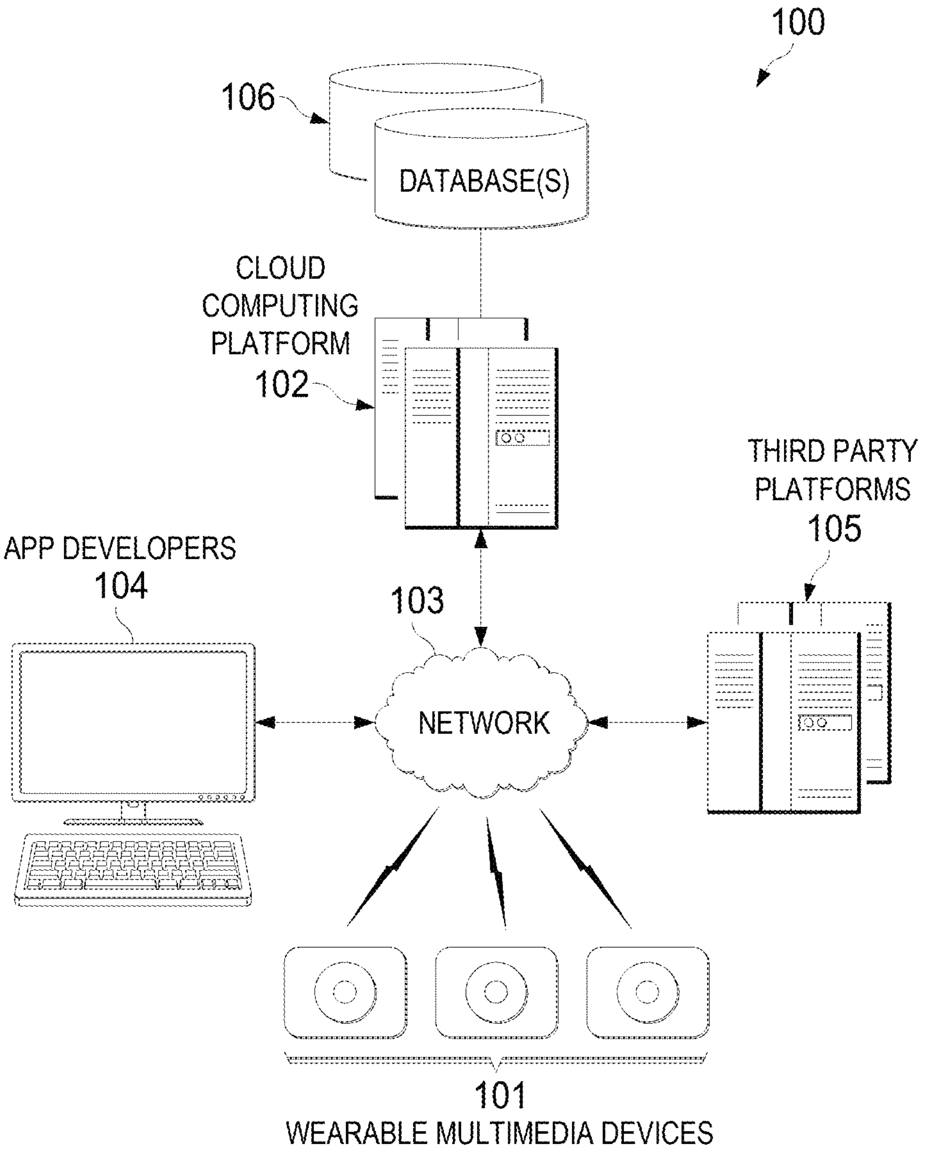
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured, optionally cropped (e.g., to protect privacy), and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allows various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
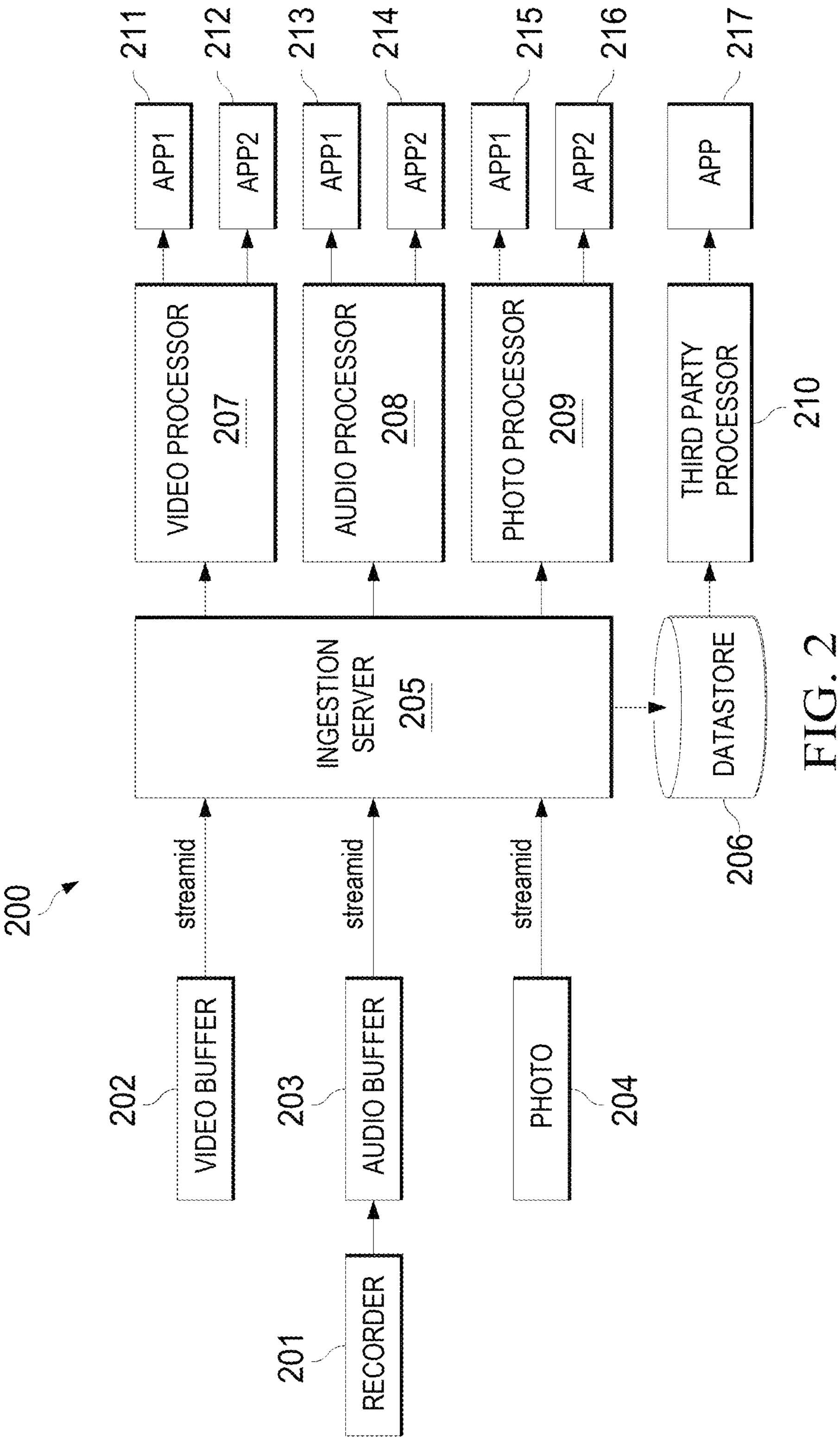
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
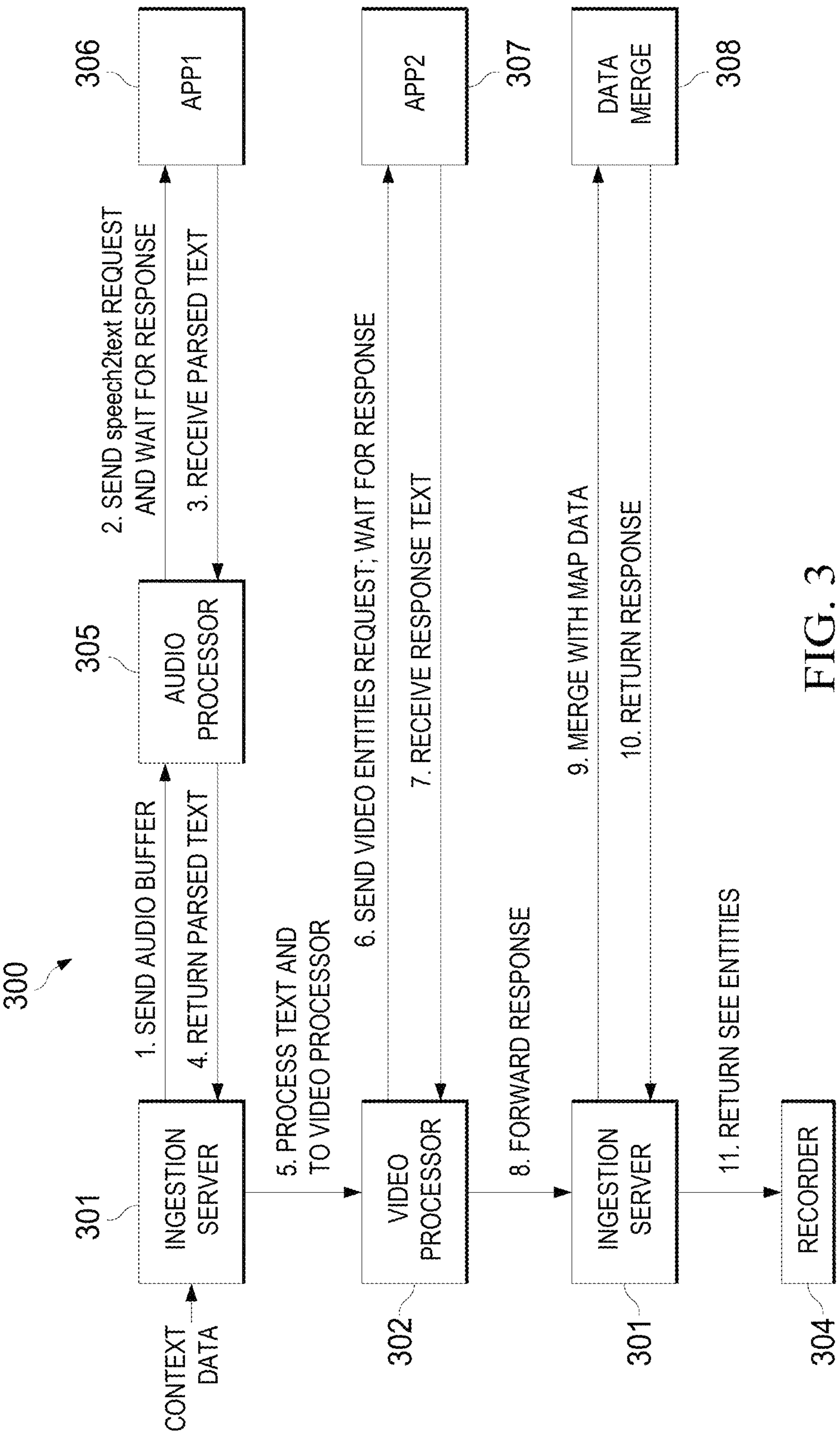
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
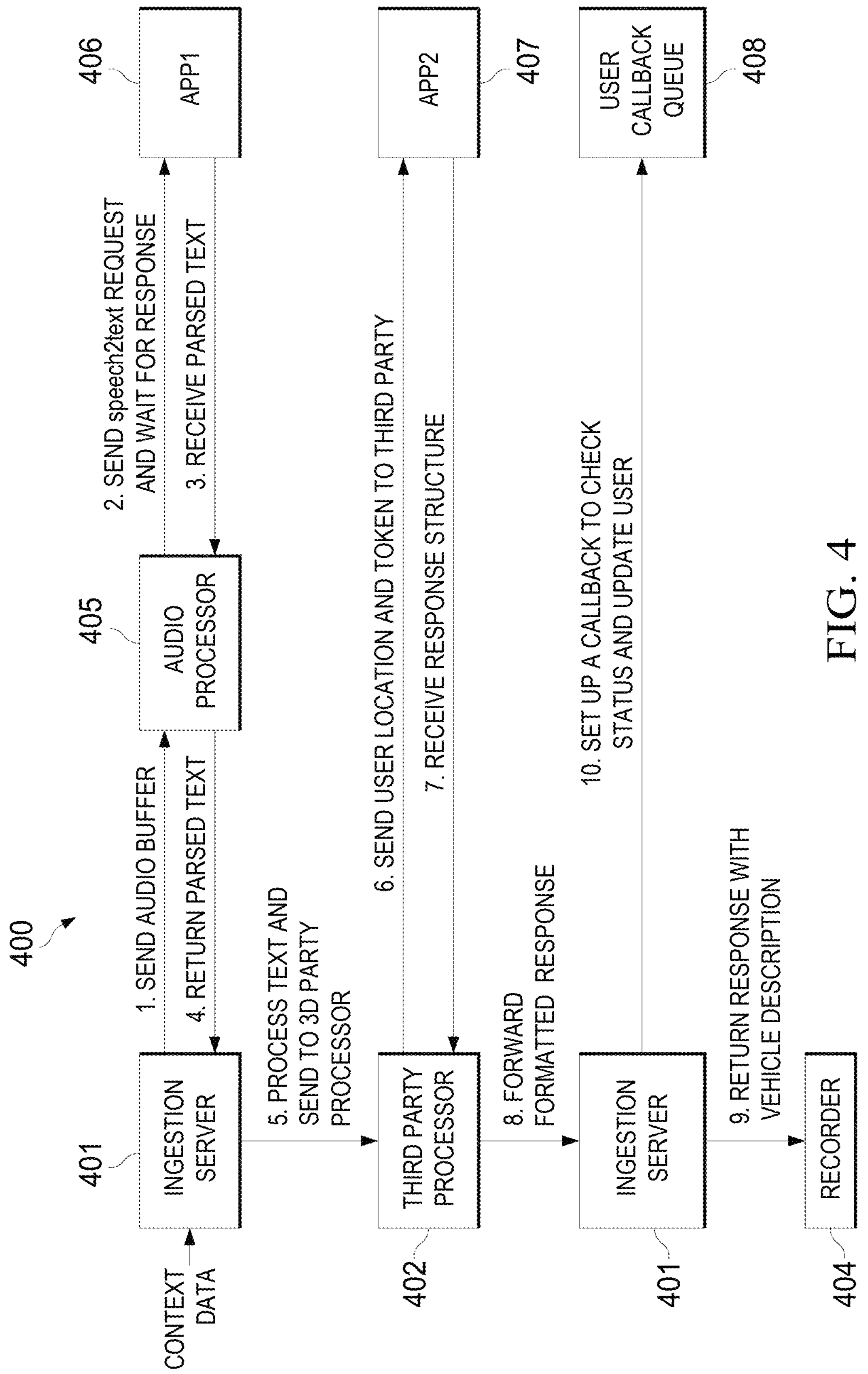
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

Figure 5:
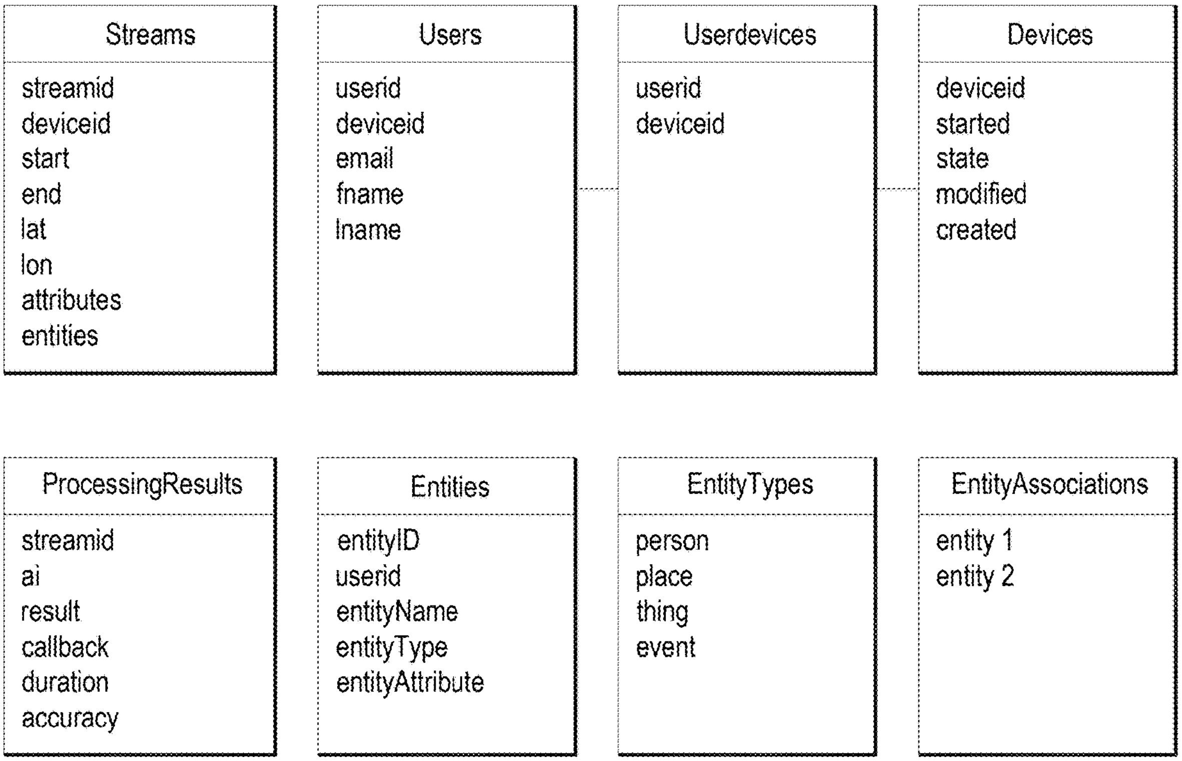
FIG. 5 illustrates data objects used by the data processing system of FIG. 2, according to an embodiment.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id: 15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
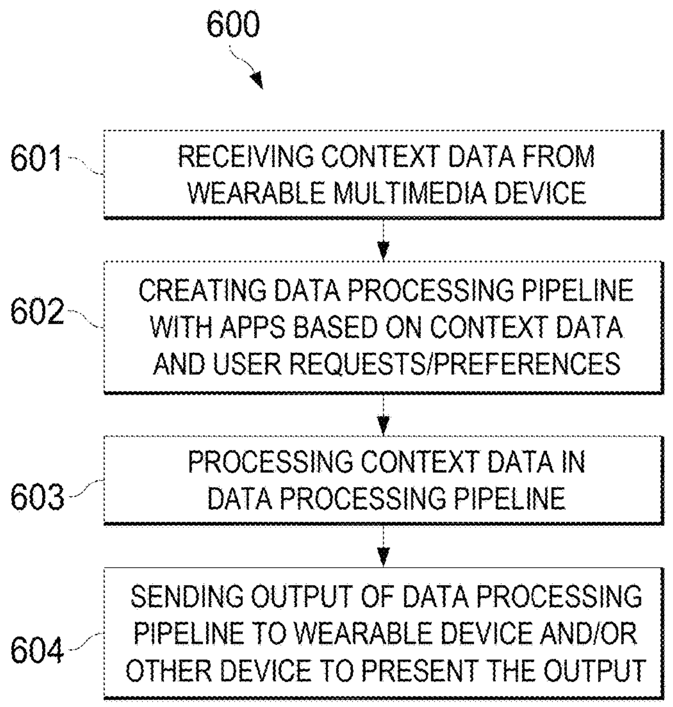
FIG. 6 is a flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
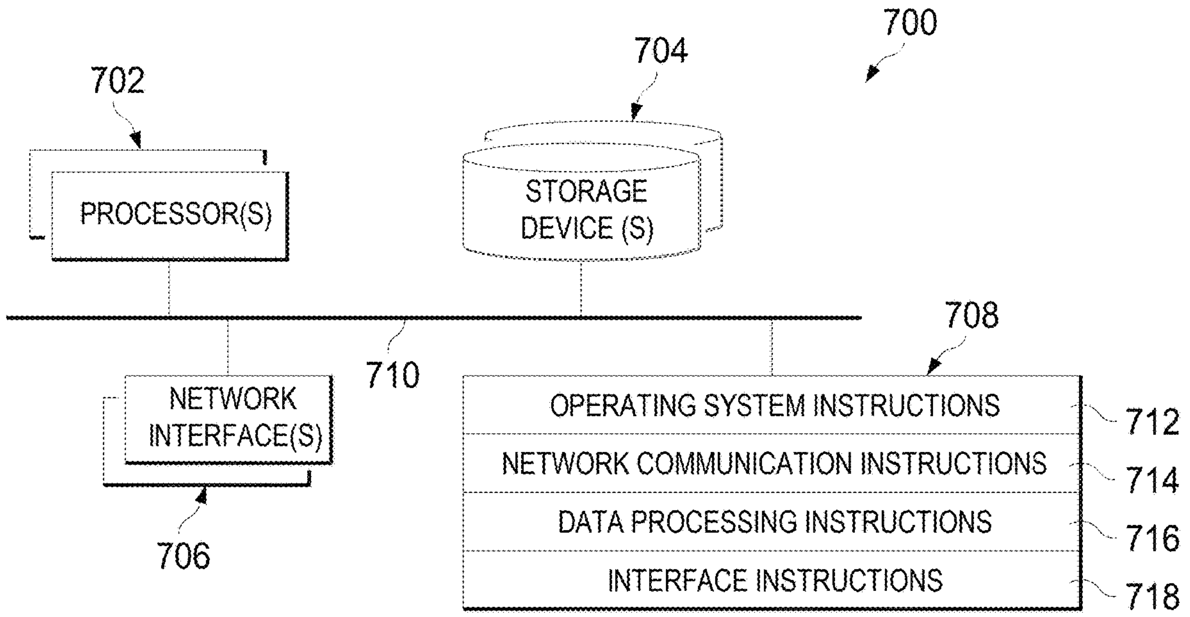
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium (s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
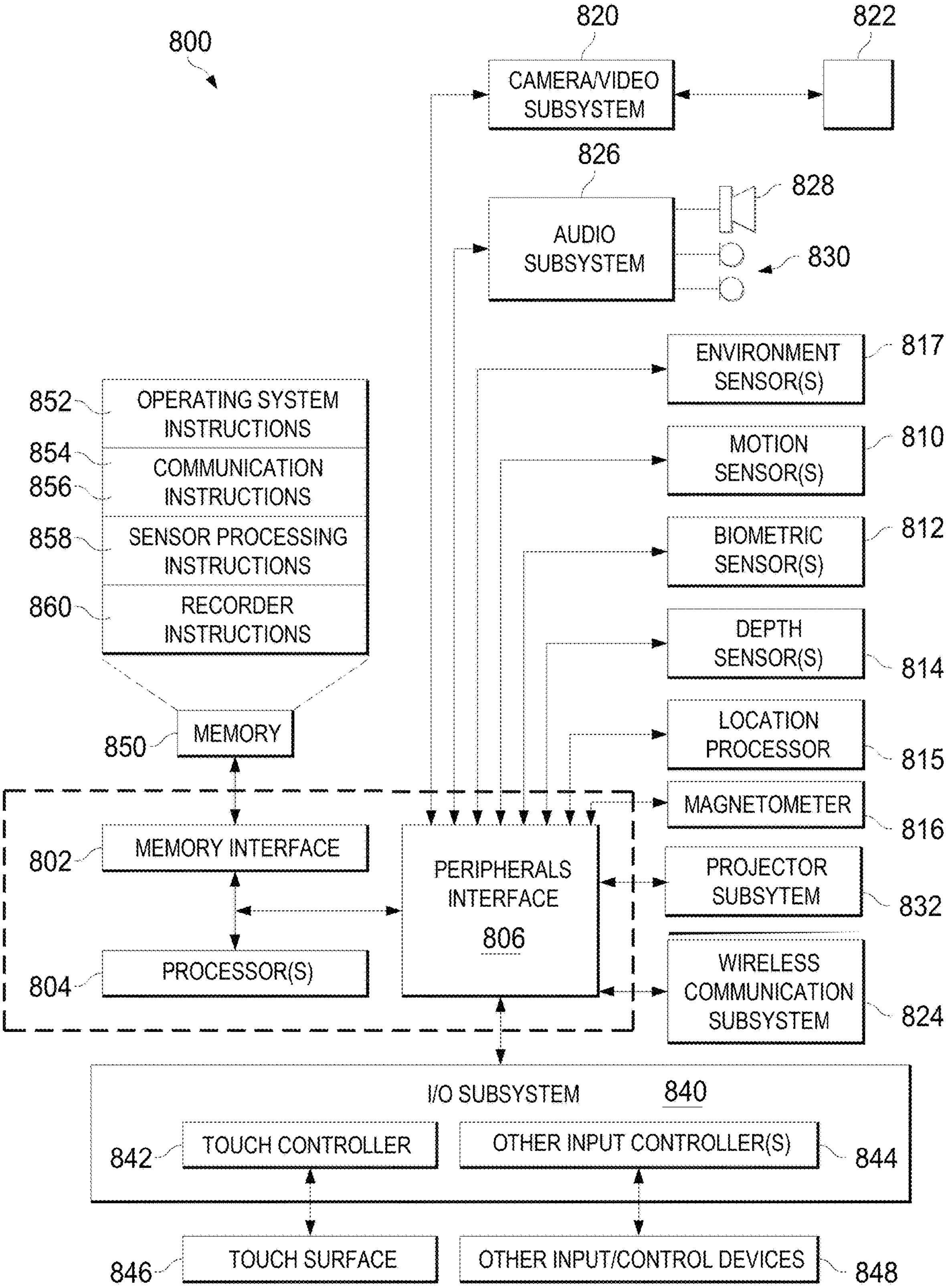
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor (s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide georeferencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementations, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. In some implementations, a user can perform a gesture using a single hand at a time (e.g., using the hand upon which the VI is projected or her other hand). In some implementations, a user can perform a gesture using two hands concurrently. The wearable multimedia device can detect the performed gestures using one or more sensors (e.g., the camera/video subsystems 820, environment sensor (s) 817, depth sensor(s) 814, etc.), identify one or more commands associated with those gestures, and execute the identified commands (e.g., using the processor(s) 804). Example VIs are described in further detail below.

In some implementations, the wearable multimedia device 101 can detect the type of surface that is positioned in the projection area of the projector subsystem 832 (e.g., using the camera/video subsystems 820, environment sensor (s) 817, depth sensor(s) 814, etc.), and adjust one or more characteristics of the VI based on the type of surface that is detected. This can be beneficial, for example, in improving the legibility and usability of the VI in different operating environments and/or use cases.

As an example, the wearable multimedia device 101 can detect that a surface of the user's hand (e.g., the user's palm) is positioned in the projection area of the projector subsystem. As the surface area of the user's hand may be constrained (e.g., compared to a surface of a desk or wall), the wearable multimedia device 101 can reduce the overall size of the VI, such that the VI can be presented in its entirety on the user hand. Further, the wearable multimedia device 101 can adjust the size, colors, shapes, spacing, complexity, and/or other visual characteristics of the use interface elements of the VI, such that the user can readily interpret and/or interact with each of the user interface elements.

As an example, the wearable multimedia device 101 can detect that a surface of a wall, table, desk, etc. is positioned in the projection area of the projector subsystem. As the surface area of a wall, table, desk, etc. may be larger (e.g., compared to a surface of the user's hand), the wearable multimedia device 101 can increase the overall size of the VI to make better use of the larger projection surface. Further, the wearable multimedia device 101 can adjust the size, colors, shapes, spacing, complexity, and/or other visual characteristics of the use interface elements of the VI, such that the user can readily interpret and/or interact with each of the user interface elements.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
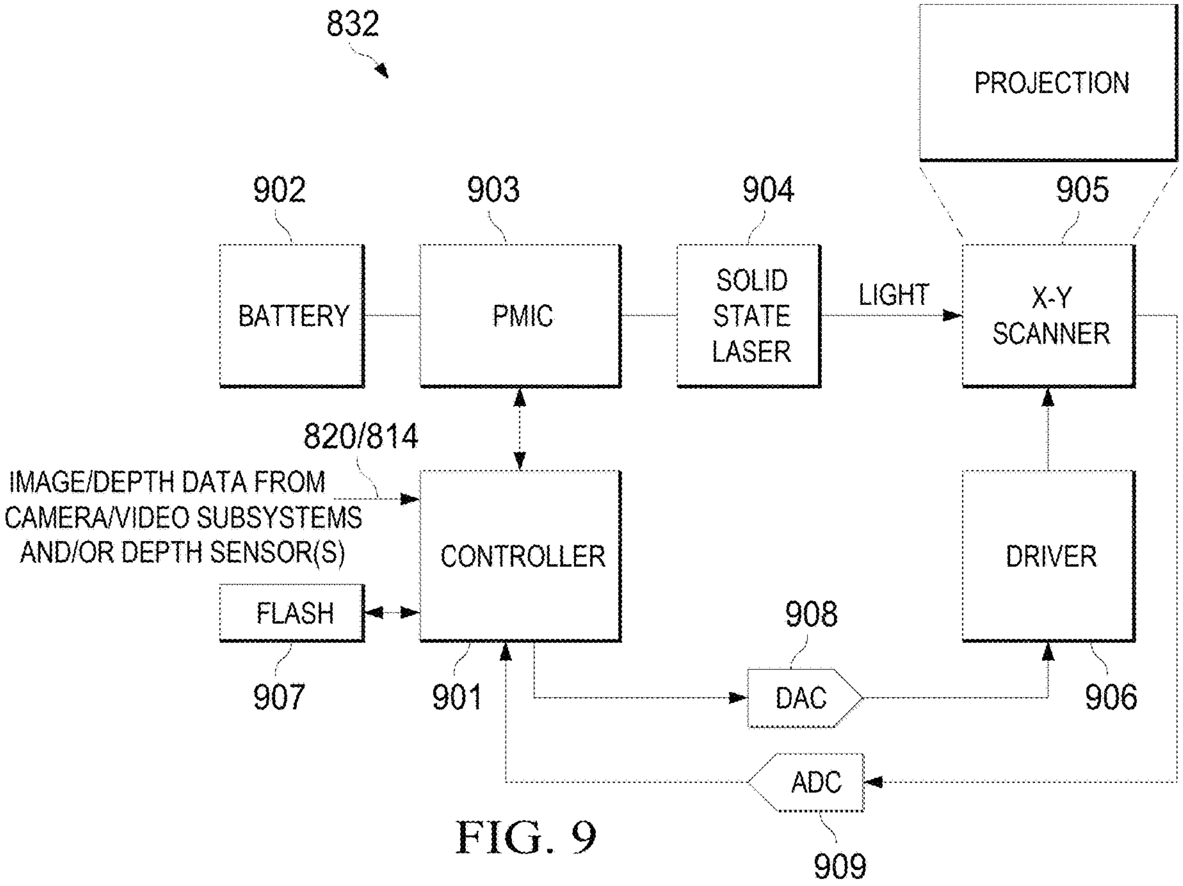
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives text, images, videos, colors, patterns, and/or any other graphical information on the surface.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. In some implementations, a user can perform a gesture using a single hand at a time (e.g., using the hand upon which the VI is projected or her other hand). In some implementations, a user can perform a gesture using two hands concurrently. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein.

In some implementations, a wearable multimedia device can present a VI that allows a user to ascertain her current location relative to one or more points of interest. This VI may also be referred to as a wayfinding interface.

Figure 10:
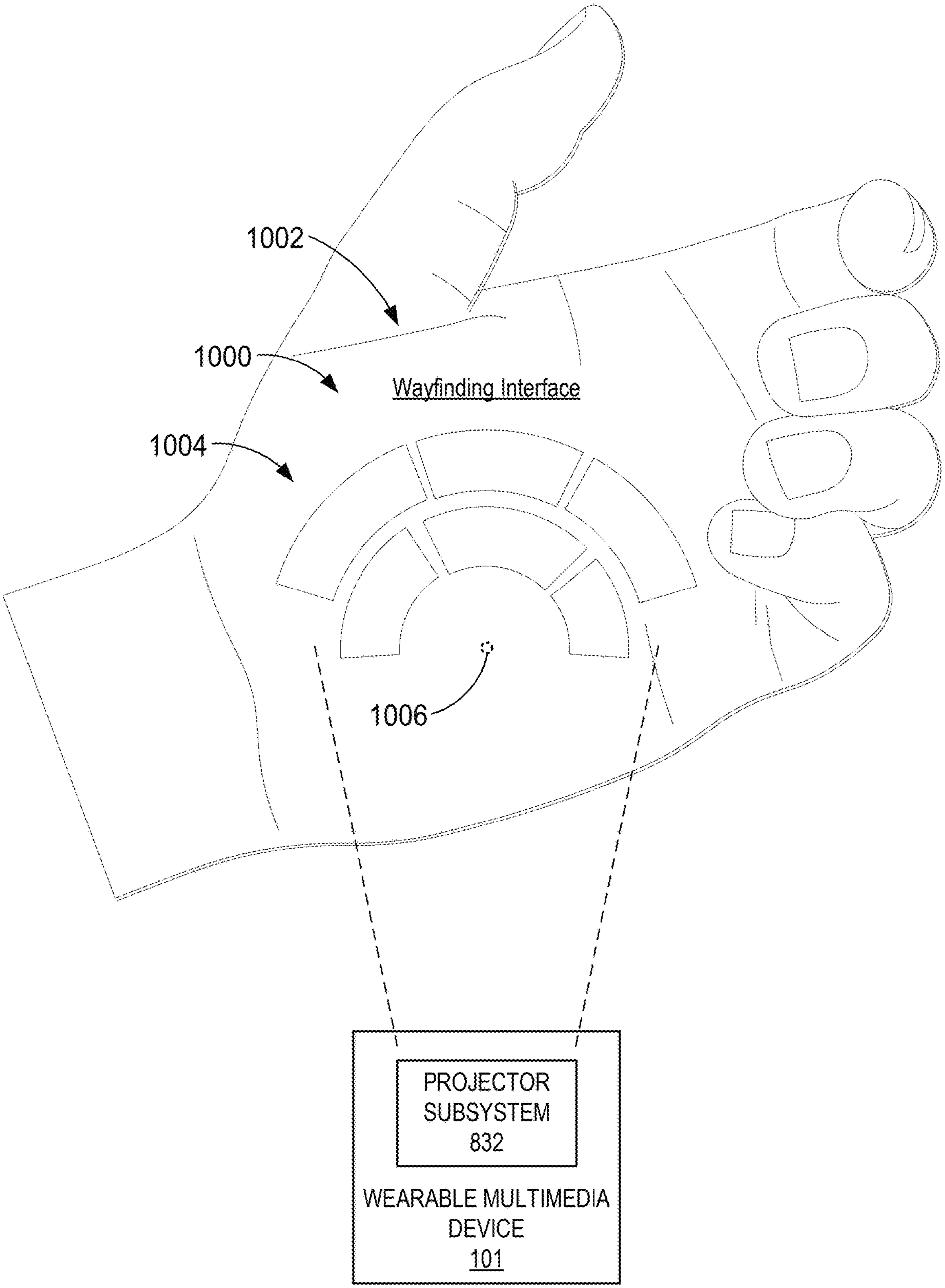
FIG. 10 is a diagram of an example virtual interface, according to an embodiment.

As an illustrative example, FIG. 10 shows a wayfinding interface 1000 projected by a projector subsystem 832 onto a user's palm 1002. The wayfinding interface 1000 includes several user interface (UI) elements 1004 (also called wayfinding UI elements 1004), each representing a different respective point of interest (POI).

In some implementations, a POI can represent a particular location or venue. Example locations or venues include stores, restaurants, bars, libraries, parks, recreation areas, stadiums or arenas, homes, apartments, landmarks, or any other locations to which a user may wish to travel.

In some implementations, a POI can represent the location of a person or group of people. In some implementations, the location or a person or group of people can be provided by one or more location aware devices that are worn or held by the person or group of people, such as a wearable multimedia device or smartphone having a location processor.

In some implementations, a POI can represent the location of one or more items. Example items include keys, wallets, smartphones, tablets, computers, printers, vehicles, or tracking devices that can be attached to other objects (e.g., Tile® tracking devices, AirTag® tracking devices, etc.). Other example items include audiovisual equipment, such as televisions, computer monitors, home theater or stereo receivers, projectors, speakers, microphones, cameras, etc. Other example items include appliances, such as refrigerators, dishwashers, washing machines, clothes dryers, etc. Other example items include lighting devices, such as lamps, light fixtures, etc. Other example items include networking equipment, such as wireless access points, routers, switches, modems, etc.

The user can use the wayfinding interface 1000 to determine the heading and/or distance (or approximations thereof) of each the POIs relative to her current location. Further, the user can use the wayfinding interface 1000 to identify a particular POI, obtain further information regarding a particular POI, and/or navigate to a particular POI.

In some implementations, the wayfinding interface can present information to the user according to one or more curved layers. For instance, in the example shown in FIG. 10, the wayfinding UI elements 1004 are arranged on two curved layers (e.g., each forming a respective portion of a ring or annulus). Further, the curved layers are stacked or concentrically arranged. For example, the curved layers can be arranged around an origin point (e.g., an origin point 1006). The angular position of each wayfinding UI element 1004 (e.g., relative to the origin point 1006) can represent the heading of the corresponding POI from the user (or an approximation thereof). Further, the distance of each wayfinding UI element 1004 from the origin point 1006 can represent the distance of the corresponding POI from the user (or an approximation thereof). Further, the wearable multimedia device 101 can continuously update the wayfinding interface 1000 based on the movements of the user, such that the user can continuously ascertain the locations of each of the POIs relative to her current location.

The implementations described herein can provide various technical benefits. For instance, the wayfinding interfaces 1000 described herein can provide an improved user interface that allows a user to identify POIs in her vicinity, and navigate to those points of interest in a more intuitive manner. As an example, a user can view a wayfinding interface 10000 to visually determine specific POIs in her vicinity, and to visually determine the heading and distance of each POI relative to her current location concurrently. Further, the user can navigate to a particular point of interest by turning her body until the corresponding wayfinding UI element 1004 is in a particular angular position from the origin point 1006 (e.g., indicating that the POI in directly in front of her), and walking in that direction until she arrives at the POI. Further, while the user is walking, she can periodically or continuously refer to the wayfinding interface 1000 to ensure that she is walking in the correct direction. Thus, the user is less likely to navigate in an unintended or erroneous direction.

In some implementations, the wearable multimedia device 101 can determine the location of the user by determining the location of the wearable multimedia device 101 itself (e.g., when the wearable multimedia device 101 is being worn or carried by the user, or when the wearable multimedia device 101 is placed in proximity to the user). As an example, the wearable multimedia device 101 can determine its location using sensor data obtained from the location processor 815 (e.g., a GNSS receiver chip) and/or the electronic magnetometer 816. As another example, the wearable multimedia device 101 can determine its location using wireless signals obtained by the communication subsystems 824 (e.g., using signal triangulation, wireless Simultaneous Localization and Mapping (SLAM), and/or other location determination techniques).

In some implementations, the wearable multimedia device 101 can also determine the orientation of the user by determining the location of the wearable multimedia device 101 itself. For example, the wearable multimedia device 101 can be configured such that, when worn by a user, a particular portion of the wearable multimedia device 101 faces directly in front of the user. For example, the wearable multimedia device 101 can be configured such that, when worn by a user on her chest, a front portion of the wearable multimedia device 101 faces the same direction that the user's head would face the user is looking straight ahead. In some implementations, the wearable multimedia device 101 can determine its location using sensor data obtained from the electronic magnetometer 816, a compass, and/or a gyroscope.

Further, the wearable multimedia device 101 can determine the location and heading of each POI relative to the user. For example, the wearable multimedia device 101 can obtain map data that includes, for each POI, an address (e.g., a mailing address) and/or geographical coordinates (e.g., latitude and longitude) representing the geographical location of the POI. Based on the map data, the wearable multimedia device 101 can determine the distance between the user and the POI, and the heading of the POI from the user (e.g., relative to the front facing direction of the user). In some implementations, at least a portion of the map data can be stored locally on the wearable multimedia device 101. In some implementations, at least a portion of the map data can be stored remote from the wearable multimedia device 101 (e.g., on a cloud computing platform), and retrieved by the wearable multimedia device 101.

As described above, the wearable multimedia device 101 can continuously update the wayfinding interface 1000 based on the movements of the user, such that the user can continuously ascertain the locations of each of the POIs relative to her current location. As an example, if the user moves closer to a particular POI, the wearable multimedia device 101 can update the wayfinding interface 1000 such that the corresponding wayfinding UI element 1004 is positioned closer to the origin point 1006. For instance, if the wayfinding UI element 1004 is positioned on an outer layer of the stack of wayfinding UI element 1004, the wearable multimedia device 101 can update the wayfinding interface 1000 such that the wayfinding UI element 1004 is moved to an inner layer of the stack. As another example, if the user moves farther from a particular POI, the wearable multimedia device 101 can update the wayfinding interface 1000 such that the corresponding wayfinding UI element 1004 is positioned farther from the origin point 1006. For instance, if the wayfinding UI element 1004 is positioned on an inner layer of the stack of wayfinding UI element 1004, the wearable multimedia device 101 can update the wayfinding interface 1000 such that the wayfinding UI element 1004 is moved to an outer layer of the stack.

Further, if the user changes her orientation (e.g., rotates her body), the wearable multimedia device 101 can update the wayfinding interface 1000 such that the angular positions of the wayfinding UI elements 1004 reflect the new orientation of the user. For instance, if a POI is originally in front of the user, the corresponding wayfinding UI element 1004 can be positioned in front of the origin point 1006. When the user changes her orientation such that the POI is positioned on her left, the wearable multimedia device 101 can update the wayfinding interface 1000 such that the wayfinding UI element 1004 is moved towards the left of the origin point 1006 (e.g., moved in a counter-clockwise direction). Further, when the user changes her orientation such that the POI is positioned on her right, the wearable multimedia device 101 can update the wayfinding interface 1000 such that the wayfinding UI element 1004 is moved towards the right of the origin point 1006 (e.g., moved in a clockwise direction).

In some implementations, the angular position of the wayfinding UI elements 1004 about the origin point 1006 can correspond to the heading of the corresponding POI relative to the orientation of the user. For example, a vector extending in a forward direction from the origin point 1006 can represent a 0° heading from the user, a vector extending in a rightward direction from the origin point 1006 can represent a 90° heading from the user, a vector extending in a backwards direction from the origin point 1006 can represent a 180° heading from the user, and a vector extending in a rightward direction from the origin point 1006 can represent a 270° heading from the user. The wayfinding UI elements 1004 can be arranged in the stack, such that the heading of the POI from the user is reflected by the angular position of the wayfinding UI elements 1004 about the origin point 1006.

Figure 11A:
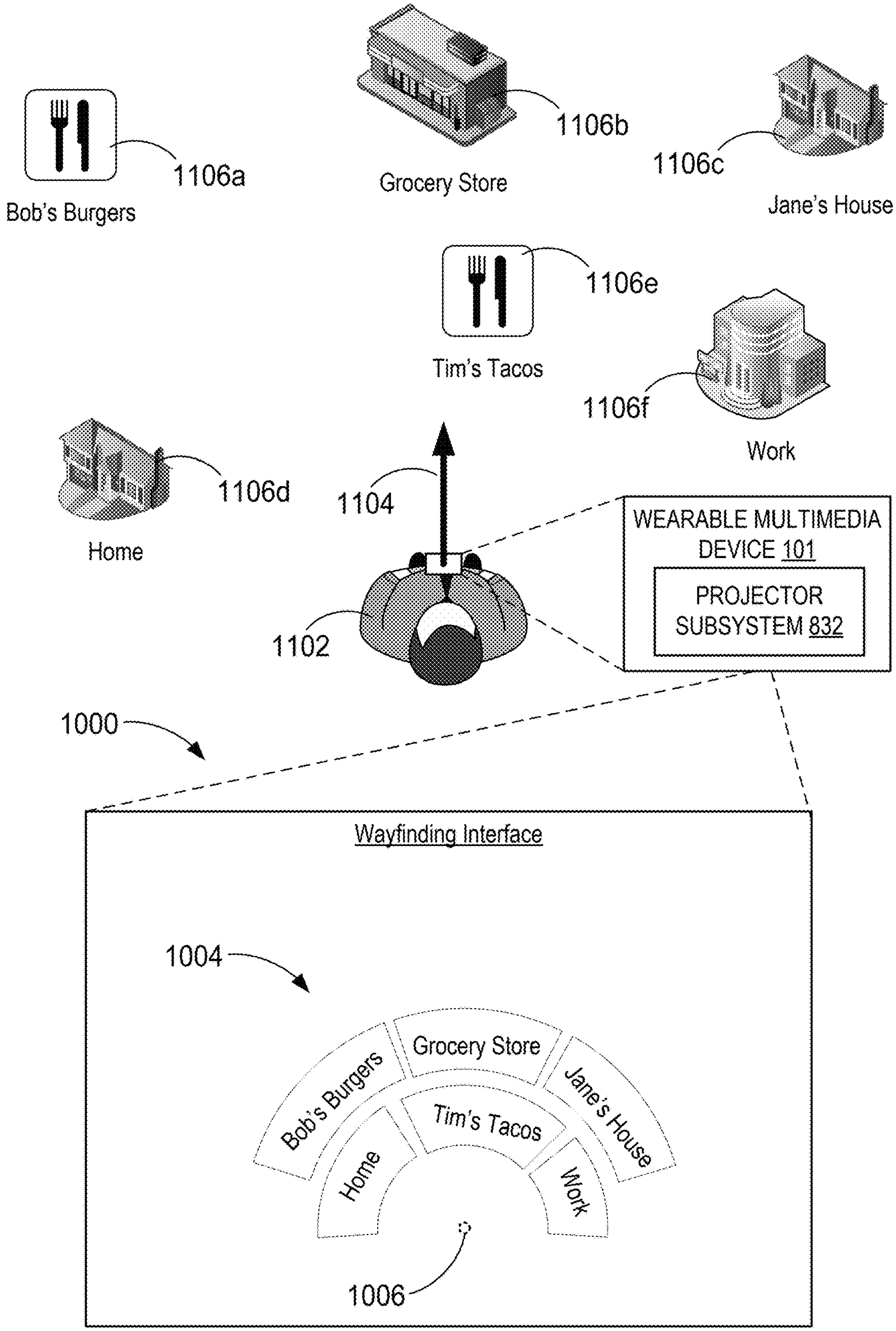
FIGS. 11A and 11B are diagrams showing example operations performed using a wayfinding interface.
Figure 11B:
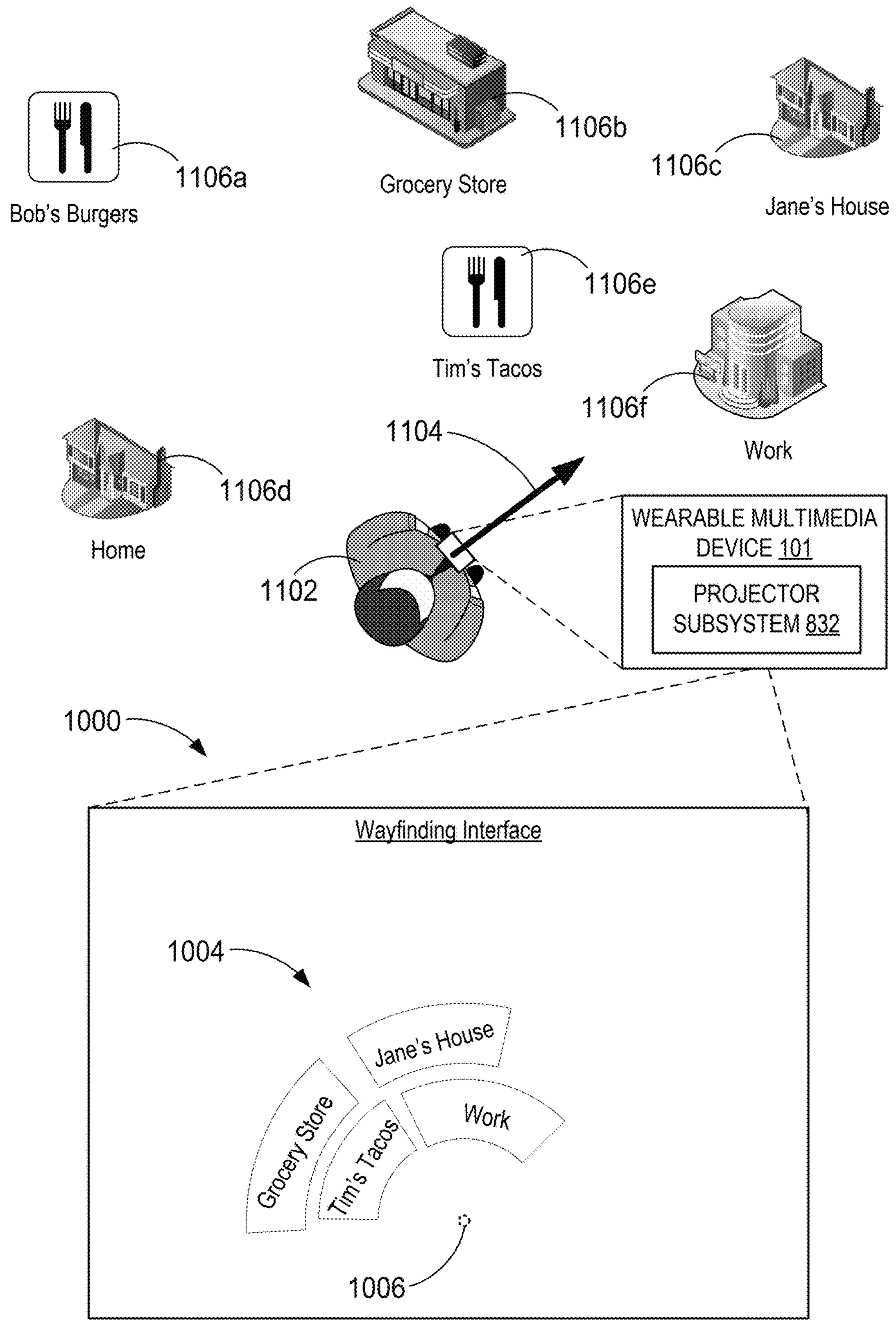

An example usage of the wayfinding interface 1000 is shown in FIGS. 11A and 11B. In this example, a user 1102 is wearing the wearable multimedia device 101 on her person (e.g., on her chest), such that a front side of the wearable multimedia device 101 faces directly in front of her (e.g., in the direction of the arrow 1104). Further, the wearable multimedia device 101 uses the projector subsystem 832 to project a VI including the wayfinding interface 1000 onto a surface (e.g., a surface of the hand of the user 1102, such as the user's palm).

In this example, several POIs **1106*a*-1106*f* are located in the vicinity of the user 1102, including "Bob's Burger" (POI 1106*a*), "Grocery Store" (POI 1106*b*), "Jane's House" (POI 1106*c*), "Home" (POI 1106*d*), "Tim's Tacos" (POI 1106*e*), and "Work" (POI 1106*f*). As shown in FIG. 11A, the POIs 1106*d*-1106*f* are positioned nearer to the user 1102 than the POIs 1106*a*-1106*c*. Further, from the perspective of the user 1102, from left to right (e.g., in a clockwise direction), the POIs 1106*a*-1106*c* are arranged in the following order: POI 1106*a*, POI 1106*b*, and POI 1106*c*. Further, from the perspective of the user 1102, from left to right (e.g., in a clockwise direction), the POIs 1106*d*-1106*f* are arranged in the following order: POI 1106*d*, POI 1106*e*, and POI 1106*f***.

The wearable multimedia device 101 generates the wayfinding interface 101 based on the POIs **1106*a*-1106*f*. The wayfinding interface includes several wayfinding UI elements 1004 arrangement a stack, each wayfinding UI elements 1004 representing a respective one of the POIs 1106*a*-1106*f*. The wayfinding interface 101 represents the distances of the POIs 1106*a*-1106*f* from the user 1102 by arranging the POIs 1106*a*-1106*c* on an outer layer of the stack, and by arranging the POIs 1106*d*-1106*f* on an inner layer of the stack (e.g., indicating that the user is closer to the POIs 1106*d*-1106*f* than is she is to the POIs 1106*a*-1106*c***).

The wayfinding interface 101 represents the heading of the POIs **1106*a*-1106*f* relative to the orientation of the user 1102 by arranging the POIs 1106*a*-1106*c* in order from left to right (e.g., in a clockwise direction) on the outer layer of the stack, and by arranging the POIs 1106*d*-1106*f*** in order from left to right (e.g., in a clockwise direction) an inner layer of the stack.

In the example shown in FIG. 11A, POI **1106*b* and POI 1106*e* are positioned approximately in front of the user 1102. Accordingly, the wayfinding UI elements 1004 for these POIs can be arranged such that they are in front of the origin point 1006. Further, POI 1106*a* and POI 1106*d* are positioned to the left of the user 1102. Accordingly, the wayfinding UI elements 1004 for these POIs can be arranged such that they are to the left of the origin point 1006 (e.g., offset in the counter-clockwise direction relative to the wayfinding UI elements 1004 representing the POI 1106*b* and POI 1106*e*, respectively). Further, POI 1106*c* and POI 1106*f* are positioned to the right of the user 1102. Accordingly, the wayfinding UI elements 1004 for these POIs can be arranged such that they are to the right of the origin point 1006 (e.g., offset in the clockwise direction relative to the wayfinding UI elements 1004 representing the POI 1106*b* and POI 1106*e***, respectively).

As described above, the wearable multimedia device 101 can continuously update the wayfinding interface 1000 based on the movements of the user 1102, such that the user 1102 can continuously ascertain the locations of each of the POIs **1106*a*-1106*f*** relative to her current location.

For instance, as shown in FIG. 11B, the user 1102 can rotate her body to the right (e.g., in a clockwise direction), such that she is facing a new direction. In response, the wearable multimedia device 101 can update the wayfinding interface 1000 to reflect the locations of each of the POIs **1106*a*-1106*f*, relative to the new orientation of the user 1102**.

As an example, in FIG. 11B, the user 1102 is now facing the POI **1106*c* and the POI 1106*f*. Accordingly, the wearable multimedia device 101 can move each of the wayfinding UI elements 1004 in a counter-clockwise direction (e.g., about the origin point 1006), such that the wayfinding UI elements 1004 representing the POI 1106*c* and the POI 1106*f* are in front of the origin point 100. Further, the POI 1106*b* and the POI 1106*e* are now to the left of the user. Accordingly, the wayfinding UI elements 1004 representing the POI 1106*b* and the POI 1106*e* are to the left of the origin point 100**.

Further, in some implementations, the wearable multimedia device 101 can selectively remove wayfinding UI elements 1004 from the wayfinding interface 1000. For instance, in the example shown in FIG. 11B, the wearable multimedia device 101 has removed the wayfinding UI elements 1004 representing the POI 1106*a* and POI 1106*d* (e.g., to make room for the other wayfinding UI elements 1004 in the wayfinding interface 1000). Nevertheless, in some implementations, the wearable multimedia device 101 can retain some or all of the wayfinding UI elements 1004 when updating the wayfinding interface 1000.

Figure 12A:
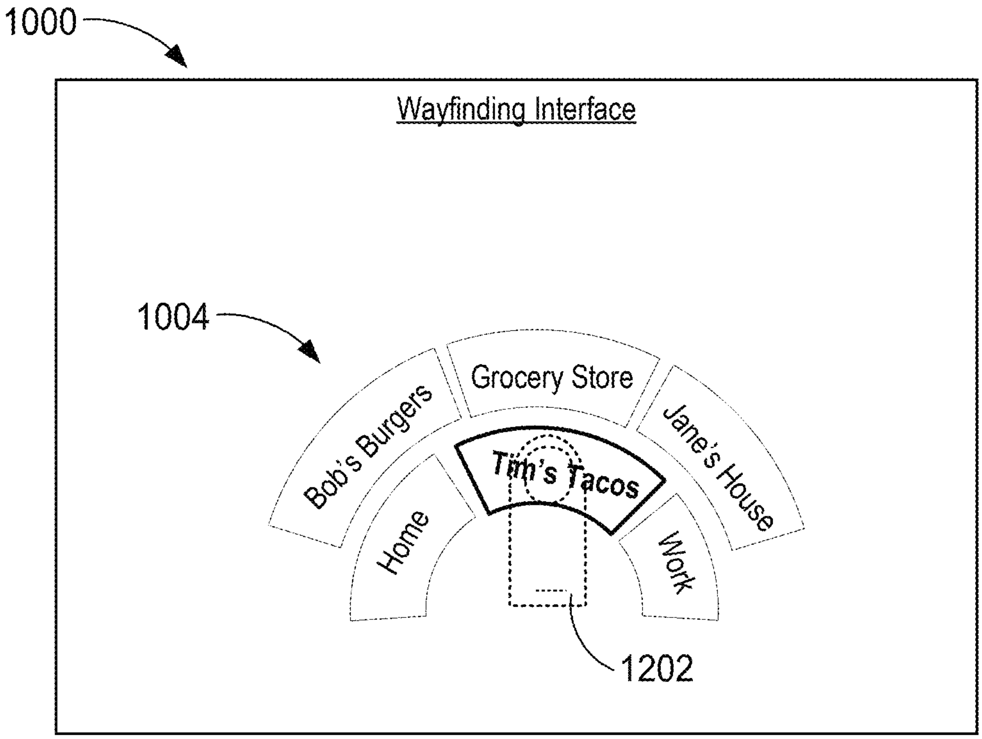
FIGS. 12A and 12B are diagrams showing further example operations performed using a wayfinding interface.
Figure 12B:
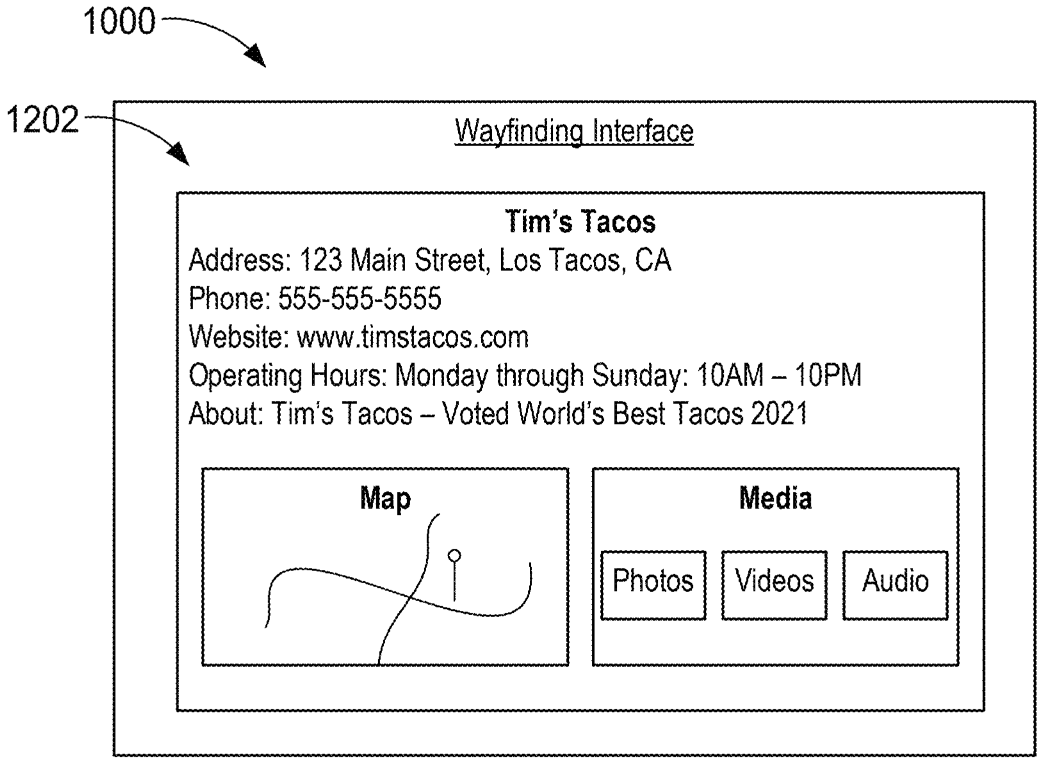

In some implementations, a user can select a wayfinding UI element 1004 to obtain addition information regarding the corresponding POI. As an example, as shown in FIG. 12A, a user can select a wayfinding UI element 1004 by performing a gesture with her finger 1202 (e.g., hovering her finger 1202 over the wayfinding UI element 1004, tapping the wayfinding UI element 1004 one or more times in a sequence, swiping the wayfinding UI element 1004, etc.). In response, the wearable multimedia device 101 can update the wayfinding UI element 1004 to display additional information regarding the corresponding POI. For instance, as shown in FIG. 12B, the wearable multimedia device 101 can present a POI UI element 1204 that displays a physical or mailing address of the POI, a telephone number associated with POI, a website associated the POI, the operating hours of the POI, and/or additional descriptive material regarding the POI. As another example, the POI UI element 1204 can display a map of the geographical area surrounding the POI (with an indication of the location of the POI on the map). As another example, the POI UI element 1204 can display media content regarding the POI, such as a photos or images, videos, audio, etc. In some implementations, at least a portion of the content displayed in the POI UI element 1204 can be stored locally on the wearable multimedia device 101. In some implementations, at least a portion of the content displayed in the POI UI element 1204 can be stored remote from the wearable multimedia device 101 (e.g., on a cloud computing platform), and retrieved by the wearable multimedia device 101.

In some implementations, a user can select a wayfinding UI element 1004 to instruct the wearable multimedia device 101 to perform one or more operations with respect to the corresponding POI. For instance, the wearable multimedia device 101 can cause one or more devices represented by the POI to perform certain operations (e.g., to remotely control the one or more devices).

As an example, the wayfinding UI element 1004 can correspond to a network-enabled lighting device (e.g., a lamp that can be remotely controlled using commands transmitted over a wireless network). The user can select the wayfinding UI element 1004 to instruct the wearable multimedia device 101 to turn on the lighting device, turn off the lighting device, change a brightness of the lighting device, change a light color off the lighting device, or any other operations with respect to the lighting device.

As other example, the wayfinding UI element 1004 can correspond to network-enabled audio visual equipment for outputting audio visual content, such as a television, computer monitor, home theater or stereo receiver, projector, speaker, etc. The user can select the wayfinding UI element 1004 to instruct the wearable multimedia device 101 to turn on the equipment, turn off the equipment, change a volume of the equipment, change a brightness of the equipment, change a channel or input of the equipment, or any other operations with respect to the equipment.

As other example, the wayfinding UI element 1004 can correspond to network equipment, such as wireless access points, routers, switches, modems, etc. The user can select the wayfinding UI element 1004 to instruct the wearable multimedia device 101 to turn on the equipment, turn off the equipment, change a setting or parameter of the equipment, or any other operations with respect to the equipment.

As other example, the wayfinding UI element 1004 can correspond to a network-enabled vehicle. The user can select the wayfinding UI element 1004 to instruct the wearable multimedia device 101 to activate or deactivate certain features of the vehicle, such as an alarm, door locks, remote start, heating or cooling of the passenger cabin, etc.

In some implementations, the wearable multimedia device 101 can visually indicate whether each of the wayfinding UI elements 1004 was previously selected by the user, is available for selection by the user, and/or is not available for selection by the user. As an example, if a user previously selected one of the wayfinding UI elements 1004 (e.g., during a previous interacting with the wayfinding interface 1000), the wearable multimedia device 101 can render that wayfinding UI element 1004 according to a particular visual style (e.g., a particular color, highlight, pattern, border style, size, etc.). As another example, if one of the wayfinding UI elements 1004 is available for selection by a user (e.g., the user can select the wayfinding UI element 1004 to initiate one or more operations, such as those described above), the wearable multimedia device 101 can render that wayfinding UI element 1004 according to another visual style (e.g., another color, highlight, pattern, border style, size, etc.). As another example, if one of the wayfinding UI elements 1004 is not available for selection by a user (e.g., the user cannot select the wayfinding UI element 1004 to initiate one or more operations), the wearable multimedia device 101 can render that wayfinding UI element 1004 according to yet another visual style (e.g., yet another color, highlight, pattern, border style, size, etc.). This can be beneficial, for example, as it allows the user to quickly and intuitively determine which of the wayfinding UI elements 1004 can be selected and/or which of the wayfinding UI elements 1004 that the user had previously selected when interacting with the wayfinding interface 1000.

Figure 13A:
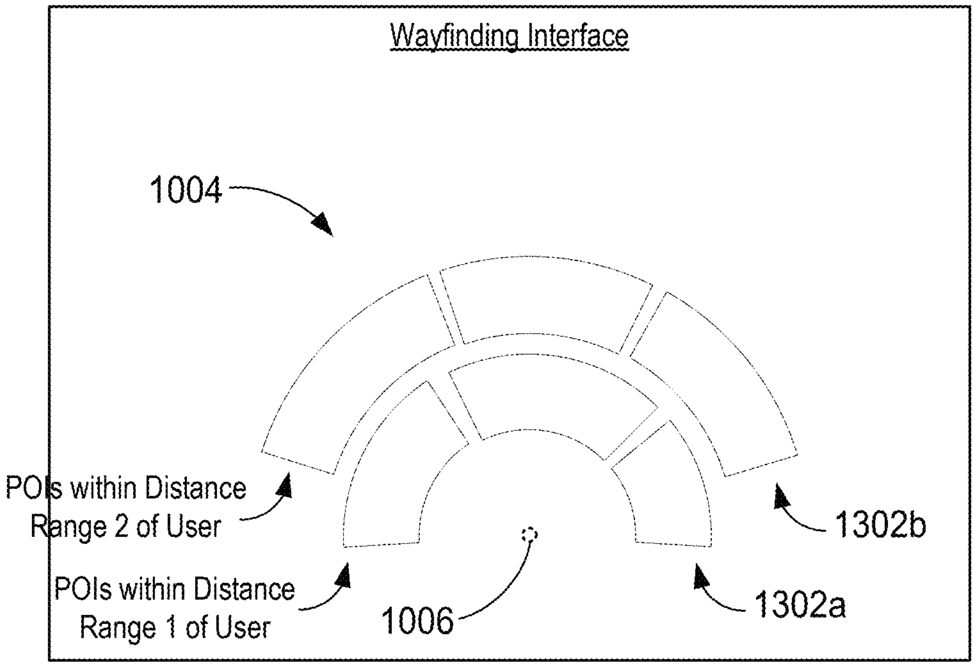
FIGS. 13A and 13B are diagrams showing example wayfinding interfaces.

As described above, in some implementations, the distance between each wayfinding UI element 1004 from the origin point 1006 can represent the distance of the corresponding POI from the user (or an approximation thereof). For instance, referring to FIG. 13A, the wayfinding UI elements 1004 in the curved layer 1302*a* can represent POIs that are within a first distance range from the user. Further, the wayfinding UI elements 1004 in the curved layer 1302*b* can represent POIs that are within a second distance range from the user, where the second distance range is greater than the first distance range.

As an illustrative example, the first distance range can be greater than zero and less than one mile, and the second distance range can be greater than or equal to one mile and less than two miles. Accordingly, a POI that is 0.5 miles from the user can be represented by a wayfinding UI element 1004 arranged on the curved layer 1302*a*, whereas a POI that is 1.7 miles from the user can be represented by a wayfinding UI element 1004 arranged on the curved layer 1302*b*.

As another illustrative example, the first distance range can be greater than zero and less than 1000 feet, and the second distance range can be greater than or equal to 1000 feet and less than 2000 feet. Accordingly, a POI that is 200 feet from the user can be represented by a wayfinding UI element 1004 arranged on the curved layer 1302*a*, whereas a POI that is 1500 feet from the user can be represented by a wayfinding UI element 1004 arranged on the curved layer 1302*b*.

In practice, any combination of distance ranges can be used, depending on the implementation.

Figure 13B:
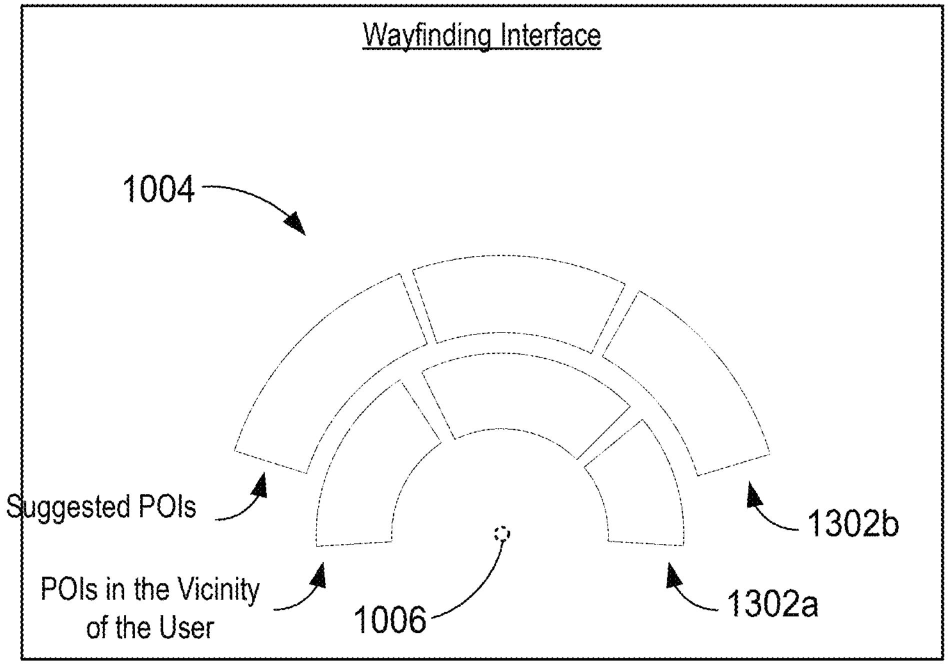

In some layers, the curved layers of the wayfinding interface 1000 can be used to present different types of information to a user. As an example, referring to FIG. 13B, a first curved layer 1304*a* can be used to present information regarding POIs that are in the vicinity of the user (e.g., within a particular threshold distance from the user). Another example, a second curved layer 1304*b* can be used to presented information regarding suggested POIs to the user (e.g., POIs that the wearable multimedia device 101 determines may be of interest to the user). This can be beneficial, for example, in allowing the user to navigate in her immediate environment (e.g., using the wayfinding UI elements in the first curved layer 1304*a*), while also viewing information regarding suggested POIs (e.g., the second curved layer 1304*b*).

In some implementations, the wearable multimedia device 101 can determine suggested POIs based on search criteria provided by the user, a travel history of the user, and/or the user's preferences.

For example, the user can provide the wearable multimedia device 101 with search criteria, such as the type of POI (e.g., restaurant, bar, store, park, etc.) and/or the name of the POI. Further, the user can specify one or more characteristics of the POI. As an example, if the user wishes to find a restaurant, the user can specify a particular type of cuisine (e.g., Japanese, French, Italian, etc.). As another example, if the user wishes to find a store, the user can specify a particular type of store (e.g., bookstore, office supply store, clothing store, etc.). As another example, the user can specify a particular geographical area for the search (e.g., a particular neighborhood, town, city, etc.). The wearable multimedia device 101 can identify one or more POIs fitting the search criteria, and present information regarding at least some of the POIs using the wayfinding interface 1000.

Further, the wearable multimedia device 101 can identify suggested POIs further based on the user's travel history. For example, the wearable multimedia device 101 can obtain historical travel data for the user, such the locations of POIs that the user previously visited, the dates and/or times of those visits, etc. Based on the historical travel data, the wearable multimedia device 101 can identify POIs that the user previously visited and/or frequently visited, and suggest one or more of those POIs to the user using the wayfinding interface 1000.

Further, the wearable multimedia device 101 can identify suggested POIs further based on the user's preferences. For instance, the wearable multimedia device 101 can obtain user preference data for the user, such information regarding the types of POIs that the user likes and/or dislikes. As an example, the user preference data may indicate that the user likes certain types of restaurants (e.g., Japanese), and dislikes certain other types of restaurants (e.g., Italian). Based on the user preference data, the wearable multimedia device 101 can identify POIs that the user is more likely to prefer, and suggest one or more of those POIs to the user using the wayfinding interface 1000.

In some implementations, the wearable multimedia device 101 can identify suggested POIs based on a combination of search criteria provided by the user, a travel history of the user, and the user's preferences. For example, the wearable multimedia device 101 can identify POIs that fit the user's search criteria, and filter the POIs based on the user's travel history and preferences (e.g., such that POIs that are inconsistent with the user's travel history and/or preferences are omitted or deprioritized). The wearable multimedia device 101 can present the filtered POIs to the user using the wayfinding interface 1000.

Figure 14A:
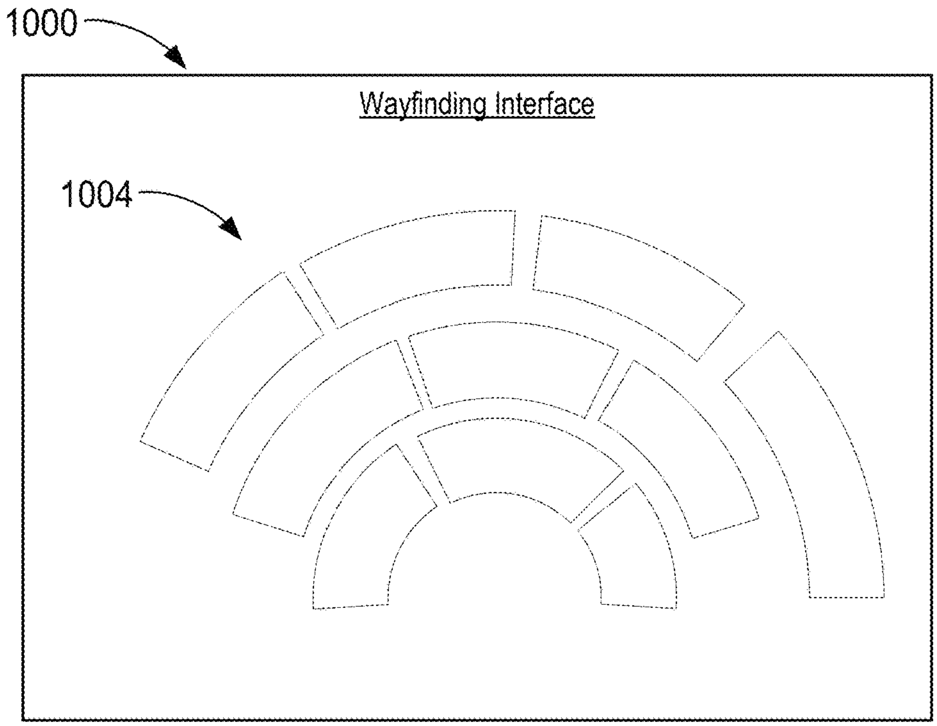
FIGS. 14A-14E are diagrams showing additional example wayfinding interfaces.

In the examples shown in FIGS. 10-13B, a wayfinding interface 1000 includes wayfinding UI elements 1004 arranged according to two curved layers in a stack. However, in practice, a wayfinding interface 1000 can include wayfinding UI elements 1004 arranged according to any number of curved layers (e.g., one, two, three, four, or more). For example, as shown in FIG. 14A, a wayfinding interface 1000 can include wayfinding UI elements 1004 arranged according to three curved layers arranged in a stack. As another example, a wayfinding interface 1000 can include wayfinding UI elements 1004 arranged according to a single curved layer.

Figure 14B:
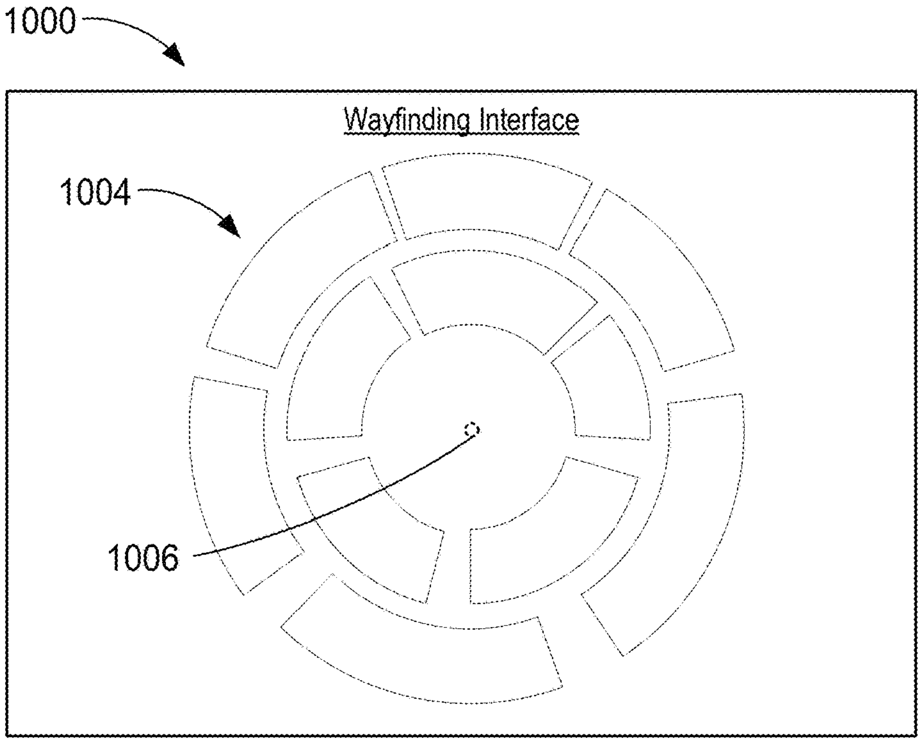

In the examples shown in FIGS. 10-13B, a wayfinding interface 1000 includes wayfinding UI elements 1004 arranged in an approximately 180° angular range about an origin point. However, in practice, a wayfinding interface 1000 can include wayfinding UI elements 1004 arranged in any 180° angular range about an origin point (e.g., a 90° range, a 180° range, a 270° range, a 360° range, or any other angular range). As an example, as shown in FIG. 14B, a wayfinding interface 1000 can include wayfinding UI elements 1004 arranged according to three curved layers arranged in a stack. As another example, a wayfinding interface 1000 can include wayfinding UI elements 1004 arranged an approximately 360° angular range about an origin point 1006. This can be beneficial, for example, as it allows the user to view information regarding POIs in any direction from the user.

Figure 14C:
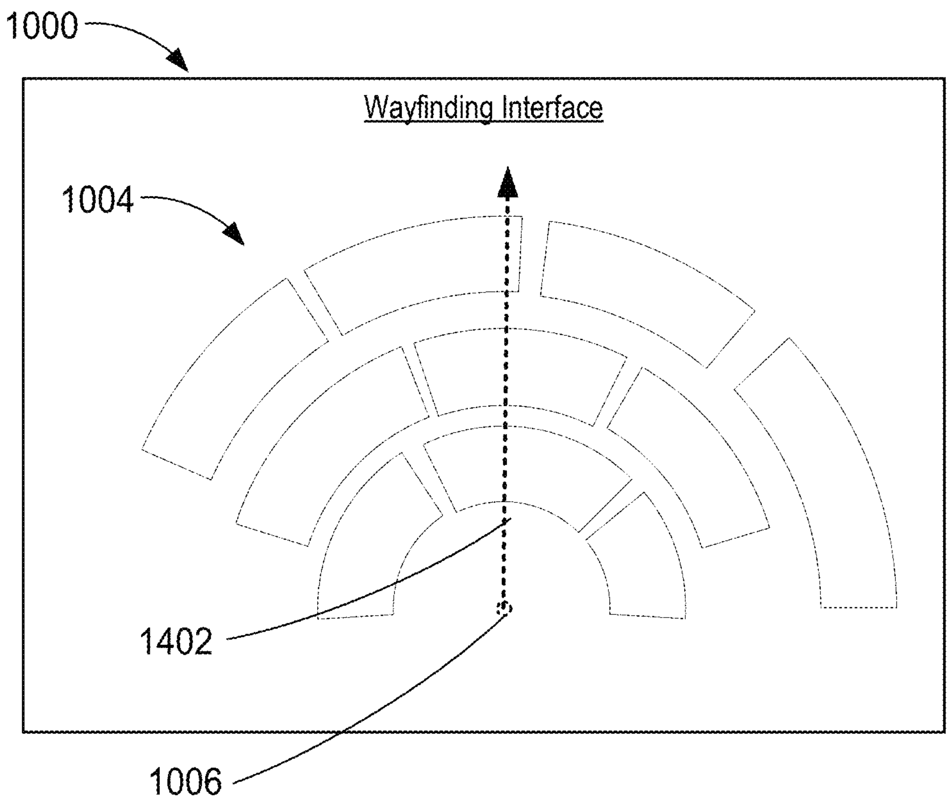

In some implementations, the wayfinding interface 1000 can visually indicate a reference heading from the user. For example, as shown in FIG. 14C, the wayfinding interface 1000 can include an arrow or line 1402 extending from the origin point 1006, and indicating a 0° heading from the user (e.g., a heading straight ahead of the user). This can be beneficial, for example, as it allows the user to more readily identify whether a particular POI is directly in front of the user, to the right of the user, or to the left of the user.

Figure 14D:
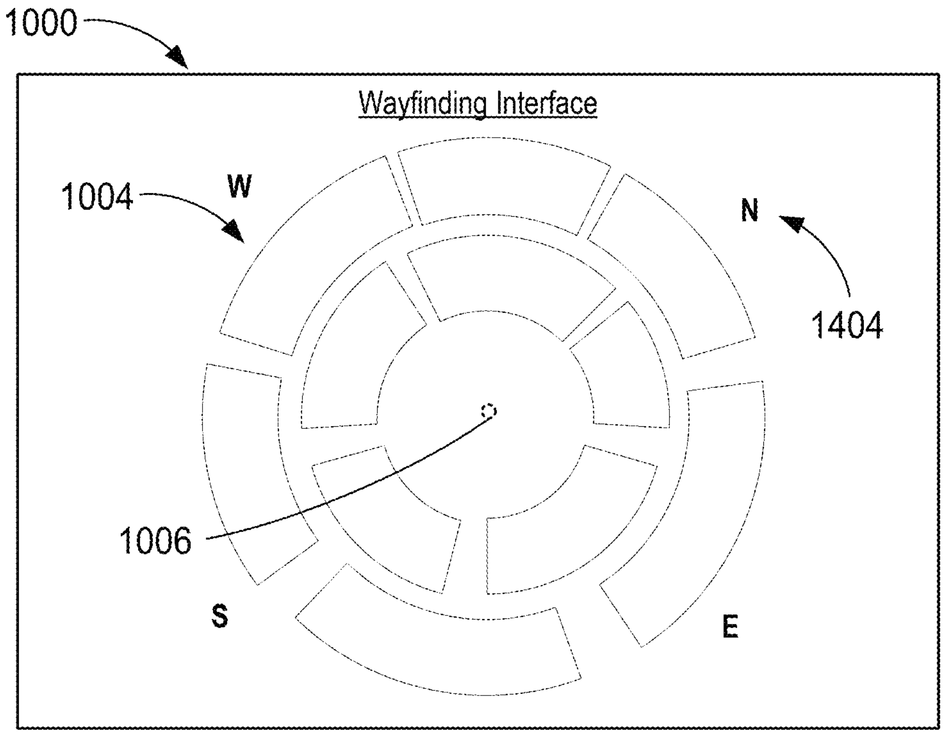

In some implementations, the wayfinding interface 1000 can visually indicate compass directions relative to the user. For example, as shown in FIG. 14D, the wayfinding interface 1000 can include compass direction labels 1404 around the wayfinding UI elements 1004 indicating north, south, east, and west directions relative to the user's current position and orientation. Further, the wearable multimedia device 101 can move the compass direction labels 1404 in response to the user's movements (e.g., such that the compass direction labels 1404 accurately reflect the compass directions as the user moves).

Figure 14E:
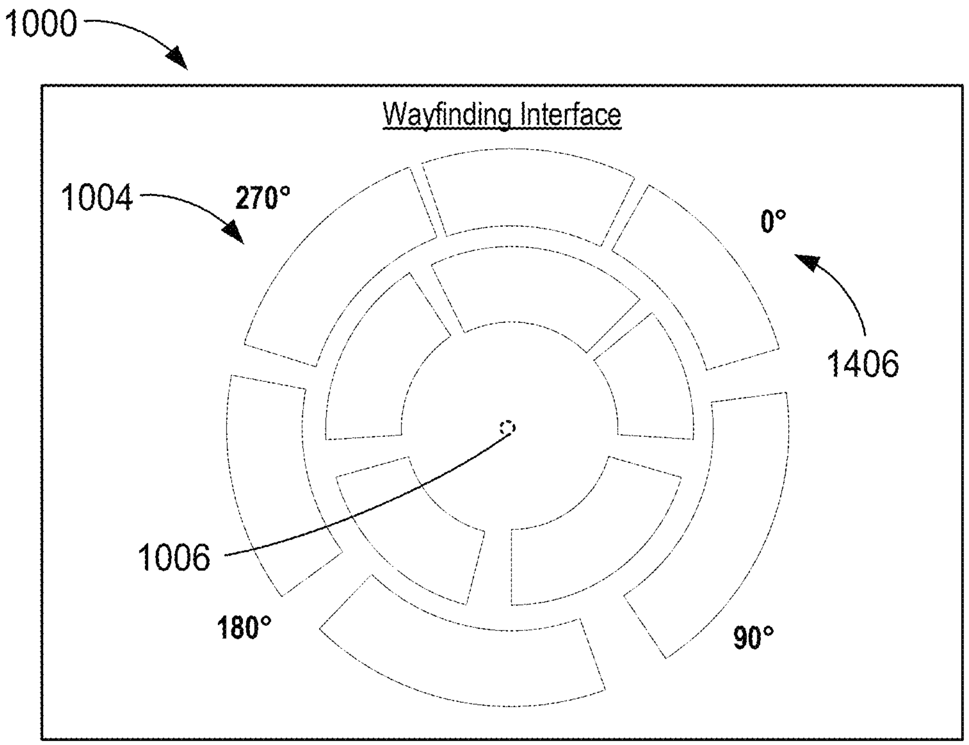

In some implementations, the wayfinding interface 1000 can visually indicate compass directions relative to the user in the form of degrees. For example, as shown in FIG. 14E, the wayfinding interface 1000 can include compass direction labels 1406 around the wayfinding UI elements 1004 indicating 0° (e.g., north), 90° (e.g., east), 180° (e.g., south), and 270° (e.g., west) relative to the user's current position and orientation. Further, the wearable multimedia device 101 can move the compass direction labels 1406 in response to the user's movements (e.g., such that the compass labels 1406 accurately reflect the compass directions as the user moves).

In the examples shown in FIGS. 10-14E, the wayfinding UI elements 1004 are depicted as curved segments (e.g., portions of an annulus of ring). However, in practice, the wayfinding UI elements 1004 can have any shape. As an example, at least some of the wayfinding UI elements 1004 can be polygonal. As another example, at least some of the wayfinding UI elements 1004 can have an oval or circular shape. As another example, at least some of the wayfinding UI elements 1004 have a free form shape.

Further, in the examples shown in FIGS. 10-14E, the wayfinding UI elements 1004 include wayfinding UI elements 1004 arranged according to curved layers, each curved layer having a circular shape (or the shape of a portion of a circle). However, in practice, the wayfinding UI elements 1004 can be arranged according to curved layers having other shapes. As an example, at least some of the wayfinding UI elements 1004 can be arranged according to layers having an ovular and/or elliptical shape.

Further, although FIGS. 10-14E describe example operations that can be performed using a VI (e.g., a VI that is projected by a projector subsystem 832), in practice, similar operations also can be performed using other types of user interfaces. As an example, some or all of these operations can be performed using a user interface that is presented using a display device such as a computer monitor or a touch sensitive display panel.

Additional Example Processes

Figure 15:
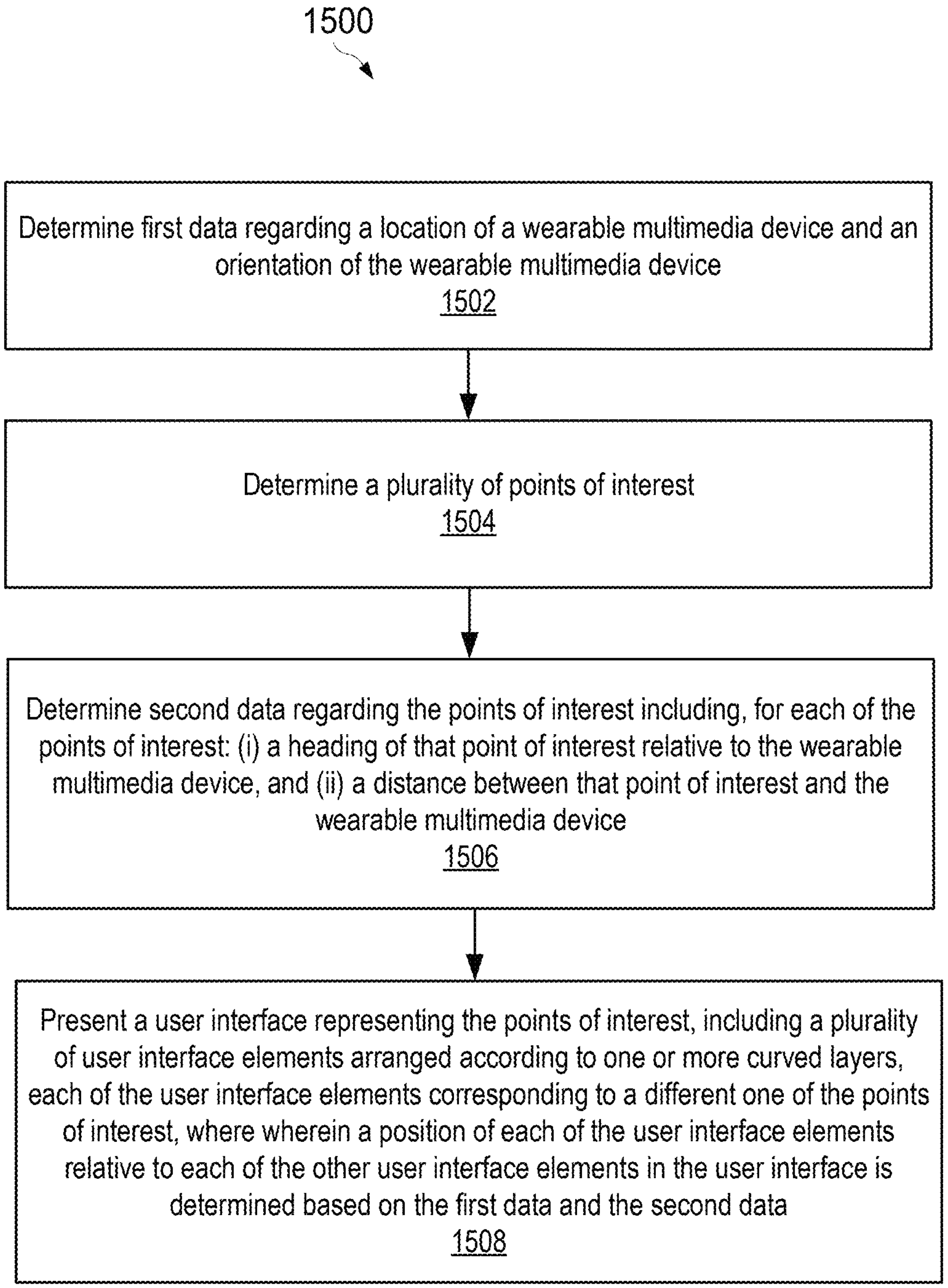
FIG. 15 is flow diagram of a process for presenting a virtual interface, according to an embodiment.

FIG. 15 is flow diagram of an example process 1500 for presenting a virtual interface to a user, according to an embodiment. Process 1500 can be implemented using wearable multimedia devices 101 described in reference to FIGS. 1-9.

According to the process 1500, a wearable multimedia device determines first data regarding a location of the wearable multimedia device and an orientation of the wearable multimedia device (block 1502). In some implementations, the first data can be determined based on sensor data obtained by at least one of a compass or a gyroscope of the wearable multimedia device. In some implementations, the first data can be determined based on output of a location processor of the wearable multimedia device.

The wearable multimedia device determine a plurality of points of interest (block 1504).

Further, the wearable multimedia device determines second data regarding the points of interest (block 1506). The second data includes, for each of the points of interest a heading of that point of interest relative to the wearable multimedia device, and a distance between that point of interest and the wearable multimedia device. In some implementations, at least a portion of the second data can be retrieved from one or more computer system remote from the wearable multimedia device.

Further, the wearable multimedia device presents a user interface representing the points of interest (block 1508). The user interface includes a plurality of user interface elements arranged according to one or more curved layers. Each of the user interface elements corresponds to a different one of the points of interest. Further, a position of each of the user interface elements relative to each of the other user interface elements in the user interface is determined based on the first data and the second data.

In some implementations, presenting the user interface can include projecting the user interface on a surface using a laser projector of the wearable multimedia device. In some implementations, the surface can be a surface of a hand of a user. In some implementations, the surface can be a surface of a palm of a user.

In some implementations, the user interface elements can be arranged according to a plurality of curved layers. Further, the curved layers can be concentrically arranged in the user interface.

In some implementations, a first subset of the user interface elements can be arranged on a first curved layer having a first radius, and a second subset of the user interface elements can be arranged on a second curved layer having a second radius. The first curved layer and the second curved layer can be concentric. Further, the second radius can be greater than the first radius.

Further, the first subset of the user interface elements can represent a first subset of the points of interest that are within a first distance range from the wearable multimedia device. Further, the second subset of the user interface elements can represent a second subset of the points of interest that are within a second distance range from the wearable multimedia device. The second distance range can be greater than the first distance range.

In some implementations, the user interface can include an origin point. Further, a distance from each of the user interface elements to the origin point can represent the distance from a corresponding one of the points of interest to the wearable multimedia device.

In some implementations, the user interface can include an origin point. Further, an angular position of each of the user interface elements relative to a vector extending from the origin point can represent the heading of a corresponding one of the points of interest relative to the wearable multimedia device. In some implementations, the vector can represent the orientation of the wearable multimedia device.

In some implementations, the angular positions of the user interface elements can be within a 360° angular range about the origin point. In some implementations, the angular positions of the user interface elements can be within a predetermined angular range about the origin point, where the angular range is less than 360°.

In some implementations, the process 1500 can further include determining, based on the first data, that at least one of the location of the wearable multimedia device or the orientation of the wearable multimedia device has changed. Further, in response, the wearable multimedia device can modify a position of at least one of the user interface elements in the user interface.

In some implementations, the process 1500 can further include receiving user input indicating a selection of a first user interface element from among the plurality of user interface elements. The first user interface element can represent a first point of interest from among the plurality of points of interest. Further, in response, the wearable multimedia device can present third data regarding the first point of interest using the user interface.

In some implementations, the third data can include at least one of: a telephone number associated with the first point of interest, a physical address of the first point of interest, instructions for navigating to the first point of interest, a web address associated with the first point of interest, operating hours of the first point of interest, or media content representing the first point of interest.

In some implementations, the process 1500 can further include receiving user input indicating a selection of a first user interface element from among the plurality of user interface elements. The first user interface element can represent a first point of interest from among the plurality of points of interest. Further, in response, the wearable multimedia device can cause the first point of interest to perform one or more operations.

In some implementations, at least one of the points of interests can represent a venue. In some implementations, at least one of the points of interests can represent one or more people. In some embodiments, at least one of the points of interests can represent one or more items. Example, items include vehicles, lighting devices (e.g., lamps, light fixtures, etc.), networking equipment (e.g., wireless access points, routers, switches, modems, etc.), audio visual equipment (e.g., televisions, computer monitors, home theater or stereo receivers, projectors, speakers, microphones, cameras, etc.), appliances (e.g., refrigerators, dishwashers, washing machines, clothes dryers, etc.), smart phones or other computing devices, and tracking devices configured to be attached to other objects.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

determining, by an electronic device, first data regarding a location and an orientation of the electronic device;

determining, by the electronic device, a plurality of points of interest;

determining, by the electronic device, second data regarding the points of interest, wherein the second data comprises, for each of the points of interest, a heading of that point of interest relative to the electronic device; and presenting, using a display of the electronic device, a two-dimensional user interface representing the points of interest, wherein the two-dimensional user interface comprises a plurality of user interface elements arranged according to one or more curved layers, each of the user interface elements corresponding to a different one of the points of interest, and wherein a position of each of the user interface elements relative to each of the other user interface elements in the two-dimensional user interface is determined based on the first data and the second data.

2. The method of claim 1, wherein the display is a projector.

3. The method of claim 1, wherein the display is a touch sensitive display panel.

4. The method of claim 1, wherein the display is a monitor.

5. The method of claim 1, wherein the electronic device is a wearable device.

6. The method of claim 1, wherein the electronic device comprises glasses.

7. The method of claim 1, wherein an angular position of each of the user interface elements on the one or more curved layers represents the heading of a corresponding one of the points of interest relative to the electronic device.

8. The method of claim 1, further comprising:

determining, based on the first data, that the orientation of the electronic device has changed, and responsive to determining that the orientation of the electronic device has changed, modifying a position of at least one of the user interface elements in the two-dimensional user interface.

9. The method of claim 1, wherein the second data comprises, for each of the points of interest, a distance from that point of interest to the electronic device, and wherein each of the user interface elements is positioned on a respective one of the one or more curved layers based on the distance from a respective one of the point of interests to the electronic device.

10. The method of claim 9, wherein a first subset of the user interface elements are arranged on a first curved layer having a first radius, wherein a second subset of the user interface elements are arranged on a second curved layer having a second radius, and wherein the second radius is greater than the first radius.

11. The method of claim 10, wherein the first subset of the user interface elements represents a first subset of the points of interest that are within a first distance range from the electronic device, and wherein the second subset of the user interface elements represents a second subset of the points of interest that are within a second distance range from electronic device, wherein the second distance range is greater than the first distance range.

12. The method of claim 1, further comprising:

receiving user input indicating a selection of a first user interface element from among the plurality of user interface elements, the first user interface element representing a first point of interest from among the plurality of points of interest; and responsive to receiving the user input, presenting third data regarding the first point of interest using the two-dimensional user interface.

13. The method of claim 12, wherein the third data comprises at least one of:

a telephone number associated with the first point of interest, a physical address of the first point of interest, instructions for navigating to the first point of interest, a web address associated with the first point of interest, operating hours of the first point of interest, or media content representing the first point of interest.

14. The method of claim 13, wherein the first point of interest comprises a device, and wherein one or more operations comprise at least one of:

changing a power state of the device, changing a setting of the device, activating one or more features of the device, or deactivating one or more features of the device.

15. The method of claim 1, further comprising:

receiving user input indicating a selection of a first user interface element from among the plurality of user interface elements, the first user interface element representing a first point of interest from among the plurality of points of interest; and responsive to receiving the user input, causing the first point of interest to perform one or more operations.

16. An electronic device comprising:

a display;

one or more processors; and memory storing instructions that, when executed by at least one processor, cause the at least one processor to perform operations comprising:

determining first data regarding a location and an orientation of the electronic device;

determining a plurality of points of interest;

determining second data regarding the points of interest, wherein the second data comprises, for each of the points of interest, a heading of that point of interest relative to the electronic device; and presenting, using the display, a two-dimensional user interface representing the points of interest, wherein the two-dimensional user interface comprises a plurality of user interface elements arranged according to one or more curved layers, each of the user interface elements corresponding to a different one of the points of interest, and wherein a position of each of the user interface elements relative to each of the other user interface elements in the two-dimensional user interface is determined based on the first data and the second data.

17. The electronic device of claim 16, wherein the display is a projector.

18. The electronic device of claim 16, wherein the display is a touch sensitive display panel.

19. The electronic device of claim 16, wherein the electronic device is a wearable device.

20. The electronic device of claim 16, wherein the electronic device comprises glasses.

* * * * *